(12) United States Patent
Bouzid et al.

(10) Patent No.: US 9,160,844 B2
(45) Date of Patent: *Oct. 13, 2015

(54) CONVERSATION ASSISTANT

(71) Applicant: Angel.com Incorporated, Vienna, VA (US)

(72) Inventors: Ahmed Tewfik Bouzid, McLean, VA (US); Prasanna Sajeewa Naleen Perera, Columbia, MD (US); David James Rennyson, Centreville, VA (US); Michael Jerry Saylor, Vienna, VA (US); Ashwini Swaroop Reddy Dulam, Lorton, VA (US); Jonathan Hotz, Reston, VA (US)

(73) Assignee: ANGEL.COM INCORPORATED, Vienna, VA (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/731,688

(22) Filed: Dec. 31, 2012

(65) Prior Publication Data

US 2014/0038578 A1 Feb. 6, 2014

Related U.S. Application Data

(60) Provisional application No. 61/680,020, filed on Aug. 6, 2012.

(51) Int. Cl.
*H04M 1/64* (2006.01)
*H04M 3/42* (2006.01)
*H04M 3/493* (2006.01)

(52) U.S. Cl.
CPC ...... *H04M 3/42204* (2013.01); *H04M 3/42153* (2013.01); *H04M 3/4936* (2013.01);
(Continued)

(58) Field of Classification Search
CPC .. G06F 9/4443; H04L 65/40; H04M 2201/38; H04M 2203/254; H04M 2207/18; H04M 3/02; H04M 3/42178; H04M 3/493
USPC .......................... 379/88.01–88.19; 455/414.1
See application file for complete search history.

(56) References Cited

U.S. PATENT DOCUMENTS 6,587,547 B1 7/2003 Zirngibl et al.
6,658,093 B1 12/2003 Langseth et al.
(Continued)

OTHER PUBLICATIONS

PCT Notification of Transmittal of the International Search Report and the Written Opinion of the International Searching Authority for Application No. PCT/US2013/046723 dated Aug. 26, 2013, 34 pages.

(Continued)

*Primary Examiner* — Solomon Bezuayehu
(74) *Attorney, Agent, or Firm* — Christie, Parker & Hale, LLP

(57) ABSTRACT

Usage data associated with a user of a telephonic device is accessed by a remote learning engine. A service or a product that is likely to be of interest to the user is identified by the remote learning engine based on the accessed usage data. A recommended voice bundle application for the user is determined by the remote learning engine based on the accessed usage data, the recommended voice bundle application being a voice application that, when executed by the telephonic device, results in a simulated multi-step spoken conversation between the telephonic device and the user to enable the user to receive the identified service or the identified product. A recommendation associated with the recommended voice bundle application is transmitted from the remote learning engine to the telephonic device. The recommendation is presented by the telephonic device to the user through voice communications. The user through voice communications has accepted the recommendation determining is determined by the telephonic device. In response to determining that the user has accepted the recommendation, the recommended voice bundle application on the telephonic device is executed by the telephonic device.

29 Claims, 34 Drawing Sheets

(52) U.S. Cl.
CPC ....... *H04M2201/39* (2013.01); *H04M 2201/40* (2013.01); *H04M 2203/253* (2013.01); *H04M 2203/355* (2013.01)

(56) References Cited

U.S. PATENT DOCUMENTS

| | | | |
|---|---|---|---|
| 6,707,889 B1 | 3/2004 | Saylor et al. | |
| 6,788,768 B1 | 9/2004 | Saylor et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,888,929 B1 | 5/2005 | Saylor et al. | |
| 6,977,992 B2 | 12/2005 | Zirngibl et al. | |
| 7,020,251 B2 | 3/2006 | Zirngibl et al. | |
| 7,215,743 B2* | 5/2007 | Creamer et al. | 379/88.18 |
| 7,266,181 B1 | 9/2007 | Zirngibl et al. | |
| 7,428,302 B2 | 9/2008 | Zirngibl et al. | |
| 7,818,734 B2 | 10/2010 | Giannini et al. | |
| 8,041,575 B2 | 10/2011 | Agarwal et al. | |
| 2004/0117804 A1 | 6/2004 | Scahill et al. | |
| 2007/0061197 A1* | 3/2007 | Ramer et al. | 705/14 |
| 2008/0065390 A1 | 3/2008 | Ativanichayaphong et al. | |
| 2008/0294608 A1* | 11/2008 | Madhukar | 707/3 |
| 2009/0138269 A1 | 5/2009 | Agarwal et al. | |
| 2009/0154666 A1* | 6/2009 | Rios et al. | 379/88.18 |
| 2009/0204600 A1 | 8/2009 | Kalik et al. | |
| 2010/0146443 A1 | 6/2010 | Zuckerberg et al. | |
| 2011/0010324 A1 | 1/2011 | Bolivar et al. | |
| 2011/0061197 A1 | 3/2011 | Shimomura | |
| 2011/0286586 A1* | 11/2011 | Saylor et al. | 379/88.13 |
| 2012/0140904 A1* | 6/2012 | Li et al. | 379/88.01 |
| 2013/0136244 A1* | 5/2013 | Kritt et al. | 379/88.13 |
| 2013/0290339 A1* | 10/2013 | LuVogt et al. | 707/740 |

OTHER PUBLICATIONS

U.S. Non-Final Office Action for U.S. Appl. No. 13/731,699, dated May 13, 2014, 12 pages.
U.S. Non-Final Office Action for U.S. Appl. No. 13/731,740, dated Apr. 25, 2014, 37 pages.
U.S. Notice of Allowance for U.S. Appl. No. 13/731,740, dated Oct. 20, 2014, 8 pages.
U.S. Notice of Allowance for U.S. Appl. No. 13/731,699, dated Oct. 12, 2014, 8 pages.

\* cited by examiner

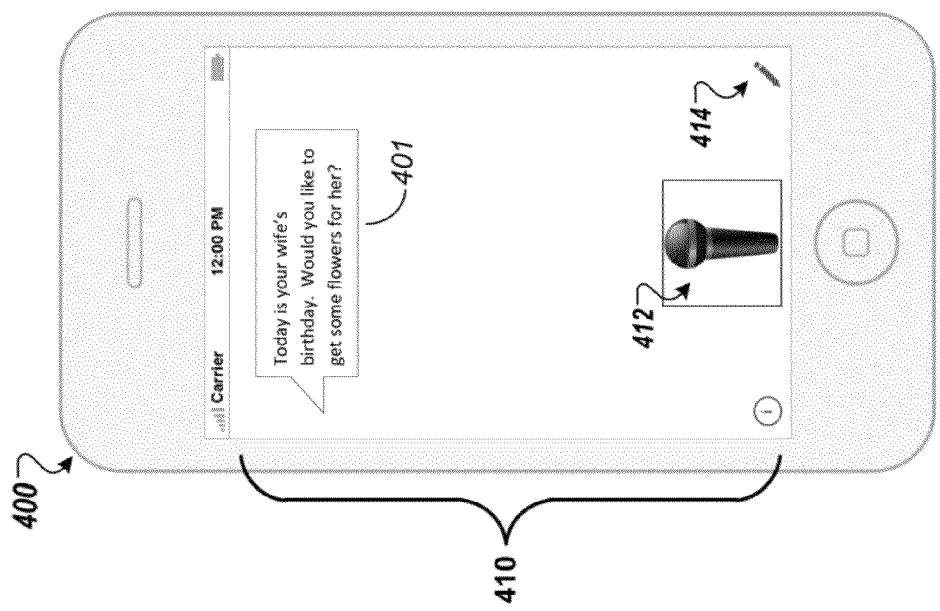

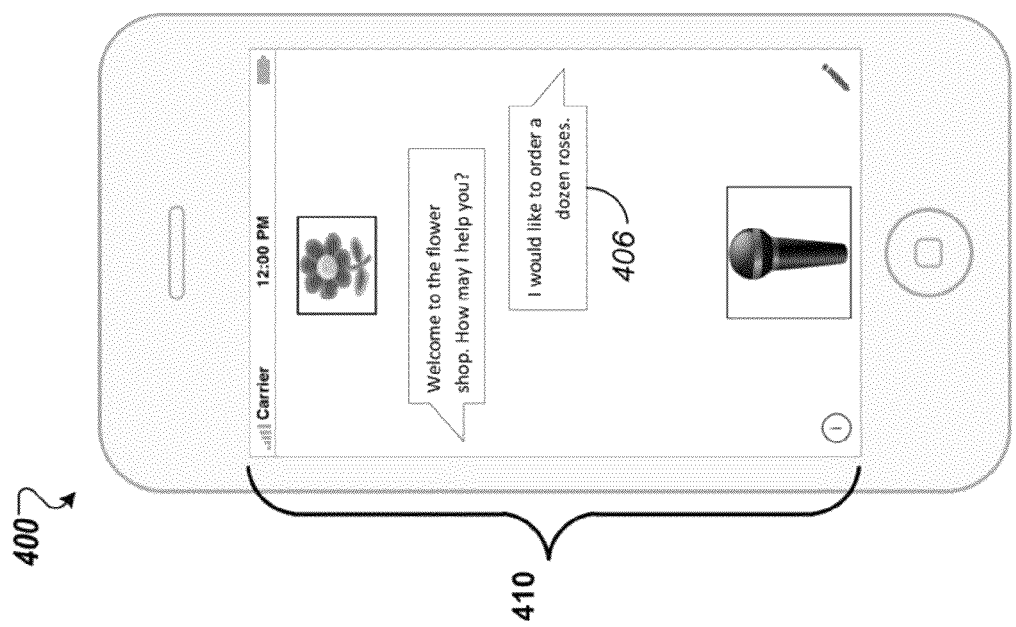

CONVERSATION ASSISTANT

CROSS-REFERENCE TO RELATED APPLICATIONS

This application claims the benefit of U.S. Provisional Patent Application No. 61/680,020, titled "Proactive Conversation Assistant" and filed on Aug. 6, 2012. The content of U.S. Provisional Patent Application No. 61/680,020 is hereby incorporated by reference into this application as if set forth herein in full.

BACKGROUND

The following disclosure relates generally to interacting with electronic conversation assistants through electronic devices.

SUMMARY

In a general aspect, a recommended voice bundle application that allows a user of a telephonic device to acquire a service or product identified based on the user's usage data is enabled by accessing, by a remote learning engine, usage data associated with a user of a telephonic device. A service or a product that is likely to be of interest to the user is identified by the remote learning engine based on the accessed usage data. A recommended voice bundle application for the user is determined by the remote learning engine based on the accessed usage data, where the recommended voice bundle application being a voice application that, when executed by the telephonic device, results in a simulated multi-step spoken conversation between the telephonic device and the user to enable the user to receive the identified service or the identified product. A recommendation associated with the recommended voice bundle application is transmitted from the remote learning engine to the telephonic device. Through voice communications, the recommendation is presented by the telephonic device to the user. The user through voice communications has accepted the recommendation is determined by the telephonic device. In response to determining that the user has accepted the recommendation, the recommended voice bundle application on the telephonic device is executed by the telephonic device.

Implementations may include one or more of the following features. For example, the recommended voice bundle application may be implemented using a software application that includes instructions executable by the telephonic device to perform the call flow, where the call flow includes a sequence of at least two prompt instructions and at least two grammar instructions executable to result in the simulated multi-step spoken conversation between the telephonic device and the user, each of the at least two prompt instructions being executable to ask for information from the user and each of the at least two grammar instructions being executable to interpret information spoken to the telephonic device by the user. Each of the at least two prompt instructions may be executable by the telephonic device to ask for information from the user and each of the at least two grammar instructions is executable by the telephonic device to interpret information spoken to the telephonic device by the user.

To transmit a recommendation, a signal may be transmitted such that, when received by the telephonic device, initiates a communication to the user that audibly or visually presents the recommendation to the user. The communication may occur through execution of an initial call flow performed by the telephonic device to simulate an initial multi-step spoken conversation between the telephonic device and the user that audibly presents the recommendation to the user, that solicits user acceptance or rejection of the recommendation, and that, conditioned on the user accepting the recommendation, is then followed by performance, by the telephonic device, of the call flow associated with the recommended voice bundle application to enable the user to receive the identified service or the identified product. The communication may occur by visually displaying text to the user. The text may be displayed during performance of an initial call flow by the telephonic device to simulate an initial multi-step spoken conversation between the telephonic device and the user that is distinct from the simulated multi-step spoken conversation corresponding to the recommended voice bundle application.

The usage data associated with the user may be updated in response to determining that the user has accepted the recommendation. A transcription of the voice communications between the telephonic device and the user may be presented on a display of the telephonic device. If the recommended voice bundle application is not installed on the telephonic device is determined in response to determining that the user has accepted the recommendation, the recommended voice bundle application may be transmitted, from the remote learning engine to the telephonic device.

To access usage data, usage data of one or more applications or usage data of one or more voice bundle applications installed on the telephonic device may be accessed by the remote learning engine. To access usage data, compiled usage data of a particular group of users associated with the user may be accessed by the remote learning engine.

To transmit a recommendation associated with the recommended voice bundle application, a contextual condition may be determined, where the contextual condition includes a time and a location for transmitting the recommendation. The recommendation that satisfies the determined contextual condition may be transmitted.

To determine the recommended voice bundle application by the remote learning engine, the recommended voice bundle application may be determined based on the service or the product identified as being likely to be of interest to the user.

The recommended voice bundle application may be implemented using State Chart Extensible Markup Language (SCXML). The recommendation may be a communication that recommends to the user that the user authorize the launching of the recommended voice bundle application to facilitate the acquisition of the identified product or the identified service by the user.

In another general aspect of a system for enabling a recommended voice bundle application that allows a user of a telephonic device to acquire a service or product identified based on the user's usage data includes a usage data store configured to store usage information. The system includes a learning engine having one or more computer processors, where the learning engine configured to access usage information associated with a user of a telephonic device from the usage data store, identify a service or a product that is likely to be of interest to the user based on the accessed usage information, determine a recommended voice bundle application based on the accessed usage information for the user, the recommended voice bundle application being a voice application that, when executed by the telephonic device, results in a simulated multi-step spoken conversation between the telephonic device and the user to enable the user to receive the identified service or the identified product, and transmit a recommendation associated with the recommended voice bundle application to the telephonic device.

The system also includes a voice bundle application data store for storing a plurality of voice bundle applications including the recommended voice bundle application.

Implementations may include one or more of the following features. For example, the system may include a recommendation engine executable by the telephonic device, where the recommendation engine is configured to receive the recommendation from the learning engine, present through voice communications to the user, the recommendation, determine that the user through voice communications has accepted the recommendation, and in response to determining that the user has accepted the recommendation, execute the recommended voice bundle application on the telephonic device.

The details of one or more implementations are set forth in the accompanying drawings and the description below. Other potential features and advantages will become apparent from the description, the drawings, and the claims.

BRIEF DESCRIPTION OF THE FIGURES

FIGS. 4A-4F are illustrations of an exemplary device displaying a series of screenshots of a GUI of a proactive conversation assistant performing voice-based interactions, and where a generic voice bundle is initiated upon interaction with the user.

DETAILED DESCRIPTION

Figure 1:
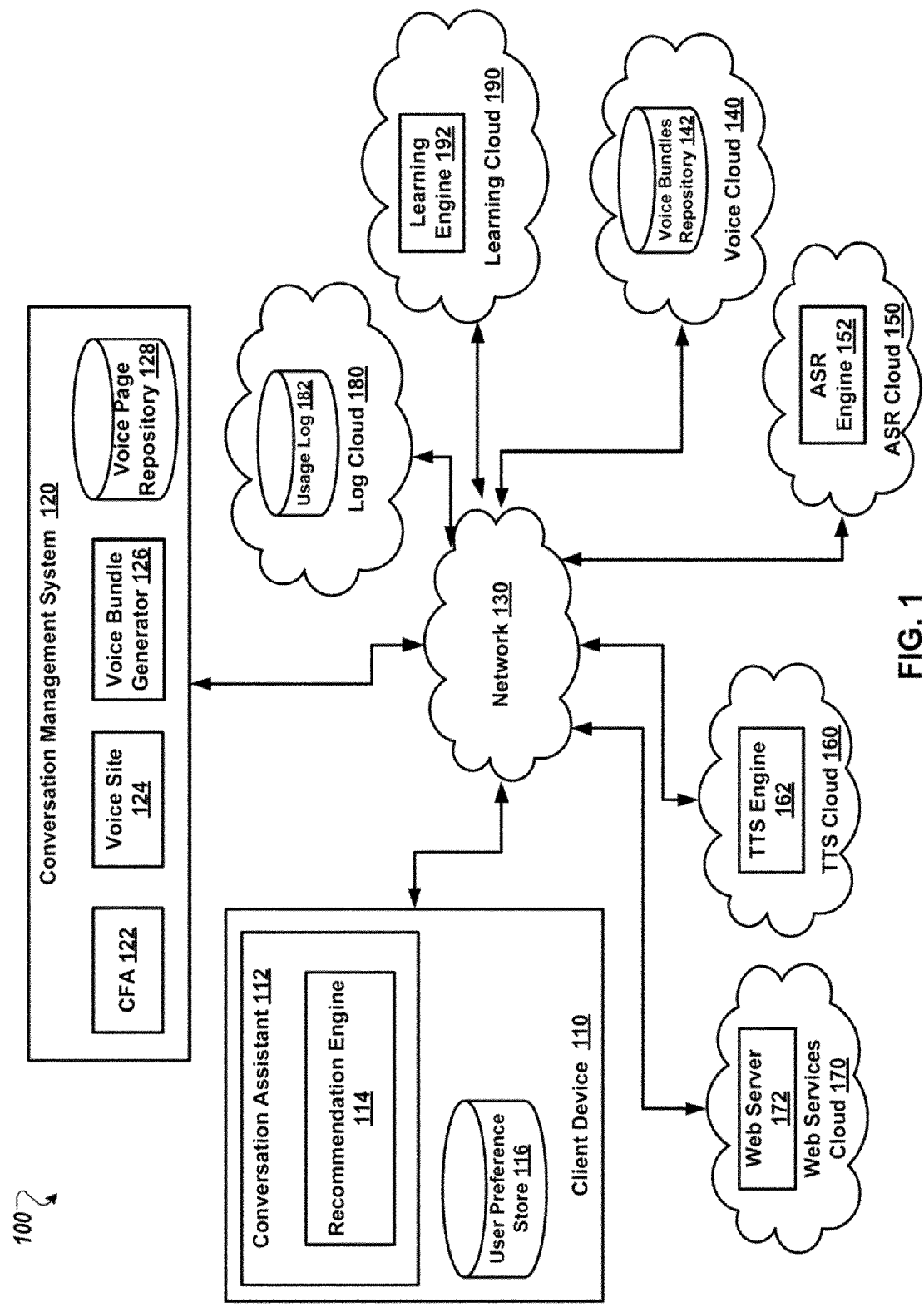
FIG. 1 illustrates a block diagram of an exemplary communications system that facilitates interaction with electronic conversation assistants.

Electronic applications that allow a user to interact with an electronic device in a conversational manner are becoming increasingly popular. For example, software and hardware applications called speech assistants are available for execution on smartphones that allow the user of the smartphone to interact by speaking naturally to the electronic device. Such speech assistants may be hardware or software applications that are embedded in the operating system running on the smartphone. Typically, a speech assistant is configured to perform a limited number of basic tasks that are integrated with the operating system of the smartphone, e.g., call a person on the contact list, or launch the default email or music applications on the smartphone. Outside the context of these basic tasks, the speech assistant may not be able to function. The speech assistant also typically operates in a passive mode, i.e. the speech assistant would respond only when there is a user's voice request.

It may be useful to have electronic assistant applications that are configured to perform a wide variety of tasks, some involving multiple steps (e.g., multiple spoken prompts and grammars), facilitating a more natural interaction of the user with the electronic device. Some of the tasks may allow the user to use popular applications like FACEBOOK™ or TWITTER™, while other tasks may be more specialized, e.g., troubleshooting a cable box, setting up a video game console, or activating a credit card. The electronic assistant application, also known as the electronic conversation assistant or simply conversation assistant, may provide a conversational environment for the user to interact with the electronic device for using the applications.

The conversation assistant may include a wrapper application provided by a service provider. Other vendors or developers may create packages that may be used with the wrapper application. By being executed within the conversation assistant, the packages may allow interaction with the user using voice, video, text, or any other suitable medium. The service provider may provide the platform, tools, and modules for enabling the developers to create and deploy of the specialized packages. For example, a developer builds a voice package using a web-based package building tool hosted by the service provider. The developer can create a "voice bundle" which is a voice package bundled for consumption on smartphones. The "voice bundle" may include a serialized representation of the call flow, the media needed for the call flow, and the parameters needed to guide the flow and the media being served. The voice bundle is deployed, along with other voice bundles or packages, in publicly accessible servers (e.g., in the "cloud"). The terms "voice bundle" and "voice bundle application" are used interchangeably. In some implementations, the voice bundle may be tagged with specific attributes associated with the voice bundle.

A voice bundle may be independent of the type of electronic device, but can be executed by a conversation assistant application provided by the service provider that is running on the electronic device. Different voice bundles may perform different tasks. For example, a social network-specific voice bundle may be configured to read newsfeed, tell the user how many messages or friend requests the user has, read the messages or friend requests, and confirm the user's friends. Another voice bundle may be configured to allow the user to purchase and send flowers by issuing spoken commands to the electronic device.

A conversation assistant is installed on the electronic device by the user who wants to use one or more voice bundles available in the cloud. With the conversation assistant, the user has access to a market of "voice bundles"—some of which are publicly available for free, some are at a premium, and some are private (the user needs a special key for access to such voice bundles). After the user downloads on the electronic device a voice bundle using the conversation assistant (or downloads the voice bundle through use of other means), the user is able to engage in a specialized conversation by executing the voice bundle via the conversation assistant application. The browsing and downloading of the voice bundles, along with the execution of the voice bundles (speaking, listening, doing), may be done directly from the conversation assistant.

The user's interactions with one or more voice bundles through the conversation assistant on the electronic device may be stored as usage data in a usage log database accessible by the service provider or the vendors of voice bundles. The usage log may also store other types of information associated with the user. For example, the usage log may store calendar or contact information on the electronic device. In some implementations, a user may opt-out such that her usage data is then not stored or accessed by others in the usage log. In some implementations, a user may opt-in to have her usage data be stored and accessible by the service provider and particular voice bundle venders as specified by the user.

To anticipate the user's future need to use a particular voice bundle, the service provider may deploy a "learning engine" to analyze the usage data in the usage log. In some implementations, a learning engine may include one or more software modules stored on a computer storage medium and executed by one or more processors. The learning engine may determine a recommendation to the conversation assistant of a particular user, and the conversation assistant may proactively make the recommendation to the user in an appropriate context (e.g. time, place, electronic device setting, etc.). Based on the user's feedback to the recommendation, the conversation assistant may further interact with the user in a conversational manner, while collecting more information regarding the user to enhance the recommendation determination in the future.

FIG. 1 illustrates a block diagram of an exemplary communications system 100 that facilitates interaction with electronic conversation assistants. The communications system 100 includes a client device 110 that is connected to a conversation management system (CMS) 120 through a network 130. The client device 110 and the CMS 120 are also connected to a voice cloud 140, an Automatic Speech Recognition (ASR) cloud 150, a Text-to-Speech (TTS) cloud 160, a web services cloud 170, a log cloud 180, and a learning cloud 190 through the network 130.

The CMS 120 includes a caller first analytics module (CFA) 122, a voice site 124, a voice generator 126 and a voice page repository 128. The voice cloud 140 includes a voice bundles repository 142. The ASR cloud 150 includes an ASR engine 152. The TTS cloud 160 includes a TTS engine 162. The web services cloud 170 includes a web server 172. The log cloud 180 includes a usage log 182, and the learning cloud 190 includes a learning engine 192.

The client device 110 is an electronic device configured with hardware and software that enables the device to interface with a user and run hardware and software applications to perform various processing tasks. The client device 110 is enabled to support voice functionality such as processing user speech and voice commands, and performing text-to-speech conversions. For example, the client device 110 may be a smartphone, a tablet computer, a notebook computer, a laptop computer, an e-book reader, a music player, a desktop computer or any other appropriate portable or stationary computing device. The client device 110 may include one or more processors configured to execute instructions stored by a computer readable medium for performing various client operations, such as input/output, communication, data processing, and the like. For example, the client device 110 may include or communicate with a display and may present information to a user through the display. The display may be implemented as a proximity-sensitive or touch-sensitive display (e.g. a touch screen) such that the user may enter information by touching or hovering a control object (for example, a finger or stylus) over the display.

The client device 110 is operable to establish voice and data communications with other devices and servers across the data network 130 that allow the device 110 to transmit and/or receive multimedia data. One or more applications that can be processed by the client device 110 allow the client device 110 to process the multimedia data exchanged via the network 130. The multimedia data exchanged via the network 130 includes voice, audio, video, image and textual data.

One of the applications hosted on the client device 110 is a conversation assistant 112. The conversation assistant 112 is an electronic application capable of interacting with a voice solutions platform, e.g., CMS 120, through the network 130. The conversation assistant 112 also interacts with the voice cloud 140, the ASR cloud 150, the TTS cloud 160, the web services cloud 170, the log cloud 180, and the learning cloud 190 through the network 130. By interacting with the various entities mentioned above, the conversation assistant 112 is operable to perform complex, multi-step tasks involving voice- and/or text-based interaction with the user of the client device 110.

The conversation assistant 112 includes a recommendation engine 114. In general, the recommendation engine 114 is operable to present proactively a recommendation to the user of the client device 110 without the user's prompt. That is, the recommendation engine 114 is operable to provide the user with a recommendation for a specific service or product that the recommendation engine 114 (or, more specifically, the learning engine 192, which communicates with the recommendation engine 114) has concluded is likely of interest to the user based on inferences drawn from the user's behavior without the user having previously overtly or directly identified the specific product or service as being desirable to the user. Additionally, the recommendation engine 114 may provide the recommendation at a time of its own choosing that is deemed most appropriate for the specific service or product (e.g., a recommendation to purchase flowers may be provided 2 days before a birthday included on the user's calendar).

In some implementations, the recommendation engine 114 may receive the recommendation from a learning engine 192 based on the usage data stored in a usage log 182. In some implementations, the recommendation may include one or more voice bundles stored in a voice bundles repository 142. The user may interact with the recommendation engine 114 using voice or text, and based on the interactions, the recommendation engine 114 may present the user with more recommendations, and store the interactions in the usage log 182. In some implementations, based on the interactions, the conversation assistant 112 may update user preferences stored in a user record. The user record may, for example, be stored in a user preference store 116 of the client device 110 or, additionally or alternatively, may be stored in a user preference store that is local to the learning engine 192, and/or the CMS 120 or that is remote to the client device 110, the learning engine 192 and/or the CMS 120 but accessible across the network 130.

In some implementations, the conversation assistant 112 may be code that is hardcoded in the hardware of the client device (e.g., hardcoded in an Application Specific Integrated Circuit (ASIC)). In other implementations, the conversation assistant 112 may be a software application configured to run on the client device 110 and includes one or more add-ons or plug-ins for enabling different functionalities for providing various services to the user. The add-ons or plug-ins for the conversation assistant 112 are known as "voice bundles". In some implementations, a voice bundle is a software application configured to perform one or more specific voice and text-based interactions (called "flows") with a user to implement associated tasks. For example, a call flow may be a sequence of prompts and grammars, along with branching logic based on received spoken input by the user, that result in a simulated spoken conversation between the client device 110 and the user. The simulated spoken conversation may be further enhanced by non-spoken communications (e.g., text or vido) that may be coordinated with the spoken communications to occur in parallel (e.g., simultaneously) or in series (e.g., sequentially) with the spoken exchanges.

The voice bundle runs on the client device 110 within the environment provided by the conversation assistant 112. As mentioned previously, the voice bundles may be platform-independent and can execute on any client device 110 running the conversation assistant 112. In order to facilitate the interaction with the user, the voice bundle uses resources provided by the ASR cloud 150, the TTS cloud 160 and the web services cloud 170. For example, the voice bundle may interact with the ASR engine 152 in the ASR cloud 150 to interpret speech (e.g., voice commands) spoken by the user while interacting with the conversation assistant 112.

Voice bundles are generated (e.g., by third-party vendors) using the voice generator 126, and then made available to users by being hosted on the voice bundles repository 142 in the voice cloud 140. The user of the client device 110 may download the conversation assistant 112 and one or more voice bundles from the voice cloud 140. For example, the user may use a web browser or voice browser application of the client device 110 to access a web page, voice page, or other audio or graphical user interface to access and download the conversation assistant 112 and to access a voice bundle marketplace to view and select voice bundles of interest to the user.

In some implementations, a voice bundle is a software package that includes code (e.g., State Chart Extensible Markup Language (SCXML) code) describing the flow of the interaction implemented by the voice bundle, media needed for the flow (e.g., audio files and images), grammars needed for interacting with resources provided by the ASR cloud 150, a list of TTS prompts needed for interacting with the TTS engine 162, and configuration parameters needed at application/account level written in Extensible Markup Language (XML). The SCXML may be World Wide Web Consortium (W3C)-compliant XML.

In some implementations, a voice bundle may be considered as an "expert" application that is configured to perform a specialized task. The conversation assistant 112 may be considered as a "collection of experts," e.g., as an "Expert Voice Assistant" (EVA). In some implementations, the conversation assistant 112 may be configured to launch or use specific expert applications or voice bundles based on a question or command from the user of the client device 110. In some implementations, the conversation assistant 112 may be configured to proactively recommend a particular voice bundle to the user based on the user's previous interactions with the applications on the client device 110. In some implementations, the conversation assistant 112 may provide a seamless interaction between two or more voice bundles to perform a combination of tasks.

The CMS 120 is a fully hosted, on-demand voice solutions platform. The CMS 120 may be implemented, for example, as one or more servers working individually or in concert to perform the various described operations. The CMS 120 may be managed, for example, by an enterprise or service provider. Third party venders may use the resources provided by the CMS 120 to create voice bundles that may be sold or otherwise provided to users, such as the user of the client device 110.

The CFA 122 included in the CMS 120 is an analytics and reporting system that tracks activities of the client device 110 interacting with the voice site 124, or one or more voice bundles through the conversation assistant 112. The CFA may be used, for example, for enhancing user experience.

The voice site 124 may be one of multiple voice sites hosted by the CMS 120. The voice site 124 is a set of scripts or, more generally, programming language modules corresponding to one or more linked pages that collectively interoperate to produce an automated interactive experience with a user, e.g., user of client device 110. A standard voice site includes scripts or programming language modules corresponding to at least one voice page and limits the interaction with the user to an audio communications mode. A voice page is a programming segment akin to a web page in both its modularity and its interconnection to other pages, but specifically directed to audio interactions through, for example, inclusion of audio prompts in place of displayed text and audio-triggered links, which are implemented through grammars and branching logic, to access other pages in place of visual hyperlinks. An enhanced voice site includes scripts or programming language modules corresponding to at least one voice page and at least one multimodal action page linked to the at least one voice page that enables interaction with the user to occur via an audio communications mode and at least one additional communications mode (e.g., a text communications mode, an image communications mode or a video communications mode). The multimodal action page may be linked to one or more voice pages to enable the multimodal action page to receive or provide non-audio communications in parallel (e.g., simultaneously with) or serially with the audio communications.

The voice site 124 may be configured to handle voice calls made using the client device 110. The voice site 124 may be an automated interactive voice site that is configured to process, using programmed scripts, information received from the user that is input through the client device 110, and in response provide information to the user that is conveyed to the user through the client device 110. In some implementations, the interaction between the user and the voice site may be conducted through an interactive voice response system (IVR) provided by a service provider that is hosting the CMS 120.

The IVR is configured to support voice commands and voice information using text-to-speech processing and natural language processing by using scripts that are pre-programmed for the voice site, for example, voice-extensible markup language (VoiceXML) scripts. The IVR interacts with the user, by prompting with audible commands, enabling the user to input information by speaking into the client device 110 or by pressing buttons on the client device 110 if the client device 110 supports dual-tone multi-frequency (DTMF) signaling (e.g., a touch-one phone). The information input by the user is presented to the IVR over a voice communications session that is established between the client device 110 and the IVR when the call is connected. Upon receiving the information, the IVR processes the information using the programmed scripts (i.e., using grammars included in the scripts). The IVR may be configured to send audible responses back to the user via the client device 110.

In some implementations, the voice site 124 may be an enhanced voice site that is configured to support multimedia information including audio, video, images and text. In such circumstances, the client device 110 and the enhanced voice site can interact using one or more of voice, video, images or text information and commands. In some implementations, a multimodal IVR (MM-IVR) may be provided by service provider of the CMS 120 hosting the voice site 124 to enable the client device 110 and the voice site 124 to communicate using one or more media (e.g., voice, text or images) as needed for comprehensive, easily-understood communications. In this context, "multimodal" refers to the ability to handle communications involving more than one mode, for example, audio communications and video communications.

The voice bundle generator 126 is a server-side module, e.g., software programs, hosted by the CMS 120 that is configured to generate one or more voice bundles based on the content of a voice site 124. The voice bundles that are generated based on the voice site 124 include flows implementing all or part of the interactions configured on the voice site 124. For example, a voice bundle may include flows corresponding to all the VoiceXML scripts associated with the voice site 124. Such a voice bundle also may include the various multimedia resources (e.g., audio files, grammar files, or images) that are accessed by the VoiceXML scripts. In another example, a voice bundle may include flows corresponding to a subset of the scripts associated with the voice site 124, and correspondingly include a subset of the multimedia resources that are accessed by the voice site 124. In these implementations, the client device 110 may, for example, initiate an outbound telephone call to a telephone number corresponding to the voice site 124 to selectively interact with the remaining Voice XML scripts of voice pages of the voice site 124, which are accessed and executed by a voice gateway (not shown) of the conversation management system 120 or are dynamically downloaded to the client device 110 for processing.

The voice page repository 128 is a database storing one or more voice pages that are accessed by voice sites, e.g., voice site 124. In this context, a voice page is a particular type of page that is configured to perform the function of delivering and/or receiving audible content to a user, e.g., user of client device 110.

The network 130 may include a circuit-switched data network, a packet-switched data network, or any other network able to carry data, for example, Internet Protocol (IP)-based or asynchronous transfer mode (ATM)-based networks, including wired or wireless networks. The network 130 may be configured to handle web traffic such as hypertext transfer protocol (HTTP) traffic and hypertext markup language (HTML) traffic. The network 130 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The voice cloud 140 includes a collection of repositories of voice bundles such as voice bundles repository 142. The repositories include computer data stores, e.g., databases configured to store large amounts of data. In one implementation, the repositories are hosted and/or managed by the same entity, e.g., by the enterprise or service provider managing the CMS 120, while in other implementations, different repositories are hosted and/or managed by different entities. The voice cloud 140 may be accessed from the CMS 120 through the network 130. However, in some cases, there may exist dedicated connections between the CMS 120 and the repositories. For example, the voice generator 126 may be directly connected to voice bundles repository 142 such that management of the voice bundles hosted by the voice bundles repository 142 are facilitated.

The voice bundles repository 142 is accessible by the client device 110 through the network 130. The voice bundles repository 142 may host both public and private voice bundles. A public voice bundle is a voice bundle that is freely accessible by any user, while a private voice bundle is accessible only by those users who have been authorized by the owner/manager of the private voice bundle. For example, when a user attempts to access a private voice bundle, the user is prompted to input a password. If the password is valid, then the user is able to access/invoke the voice bundle.

The voice bundles hosted by the voice bundles repository 142 also may include free and premium voice bundles. A free voice bundle is a voice bundle that may be used by a user without paying the owner/manager of the voice bundle for the use. On the other hand, the user may have to pay for using a premium voice bundle.

The user of client device 110 may browse various repositories in the voice cloud 140 using the conversation assistant 112 on the client device 110. Accessing the voice cloud 140 may be independent of the type of the client device 110 or the operating system used by the client device 110. The conversation assistant 112 may present the voice bundles available in the voice cloud 140 using a graphical user interface (GUI) front-end called the "voice bundles marketplace" or simply "voice marketplace". The user may be able to select and download various voice bundles that are available in the voice cloud 140 while browsing the voice marketplace (e.g., by viewing and selecting from a set of graphical icons or elements, each icon or element corresponding to a different voice bundle and being selectable to download the corresponding voice bundle). In some implementations, the conversation assistant 112 may recommend one or more voice bundles to the user based on the user's interests. The downloaded voice bundles are stored locally on the user device 110, and are readily accessible by the conversation assistant 112.

The ASR cloud 150 includes a collection of servers that are running software and/or hardware applications for performing automatic speech recognition. One such server is ASR engine 152 (e.g., ISPEECH™, GOOGLE™, and NVOQ™). When executing voice bundles, the conversation assistant 112 may access the ASR engine 152 through the network 130 to interpret the user speech.

The TTS cloud 160 includes a collection of servers that are running software and hardware applications for performing text-to-speech conversions. One such server is TTS engine 162 (e.g., ISPEECH™). When executing voice bundles, the conversation assistant 112 may access the TTS engine 162 through the network 130 to interpret the user speech.

In some implementations, the ASR engine 152 and/or the TTS engine 162 may be configured for natural language processing (NLP). In other implementations, the conversation assistant 112 and/or the voice bundles may be embedded with NLP software (e.g., INFERENCE COMMUNICATIONS™ or SPEAKTOIT™).

In some implementations, the voice bundles may be ASR and TTS-independent, i.e., the specific ASR or TTS engine may not be integrated into the voice bundles. The voice bundles may access the ASR engine 152 or TTS engine 172 when such resources are needed to perform specific tasks. This allows flexibility to use different ASR or TTS resources without changing the voice bundles. Changes may be localized in the conversation assistant 112. However, in other implementations, the voice bundles and/or the conversation assistant 112 may be integrated with an ASR engine (e.g., NOUVARIS™, COMMAND-SPEECH™), or a TTS engine (e.g., NEOSPEECH™), or both.

The web services cloud 170 couples the client device 110 to web servers hosting various web sites. One such server is web server 172. When executing voice bundles, the conversation assistant 112 may access the web site hosted by web server 172 using the web services cloud 170 to perform actions based on user instructions.

The log cloud 180 includes a collection of usage logs, such as usage log 182. The usage logs include computer data stores, e.g., databases configured to store large amounts of data. In some implementations, the usage logs are hosted and/or managed by the same entity, e.g., by the enterprise or service provider managing the CMS 120, while in other implementations, different usage logs are hosted and/or managed by different entities. The log cloud 180 may be accessed by the learning engine 192 or the CMS 120 through the network 130. In some implementations, there may exist dedicated connections between the usage logs 180 and one or more components in the communication system 100. For example, the learning engine 190 may be directly connected to the usage log 182.

In general, the usage log 182 stores usage data including information associated with the user of the client device 110, as authorized by the user. In some implementations, the usage log 182 may store a user's interactions with the conversation assistant 112 on the client device 110. In some implementations, the usage log 182 may store the user's interactions with one or more voice bundles on the client device 110. In some implementations, the usage log 182 may store other types of information associated with the user that is stored on the client device 110, such as contact list or calendar information. In some implementations, the usage log 182 may store the user's interactions with other types of non-voice applications stored on the client device 110, such as search engines, maps, or games. In some implementations, the usage log 182 receives usage data updates from the client device 110 periodically (e.g., once a day or once an hour). In some other implementations, the usage log 182 receives usage data update from the client device 110 after the user has interacted with a particular application (e.g., immediately after the application terminates or after one or more predetermined specific user interactions occur during the execution of the application).

The learning cloud 190 includes a collection of servers that are running software and/or hardware applications for analyzing usage data and providing recommendations to the client device 110. One such server is learning engine 192. In some implementations, the learning engine 192 may be integrated to the CMS 120. The learning engine 192 accesses usage data stored in the usage log 182, and based on the usage data associated with the user of the client device 110, the learning engine 192 identifies a product or service to likely be of interest to the user and determines a corresponding recommendation to be presented to the user to enable the user to choose to purchase or otherwise receive the identified product or service. In some implementations, the learning engine 192 may determine the recommendation based on usage data of a population of individuals having similar profiles or characteristics as the user. The recommendation may include one or more set of instructions for the recommendation engine 114.

In some implementations, the recommendation may include instructions to activate a voice bundle stored in the client device 110 that will facilitate a multi-step spoken conversation with the user to enable the user to receive the identified service or product. A multi-step spoken conversation may include, for example, an interaction during which two or more prompts and two or more grammars are executed by the client device 110 and/or by other elements of the system 100 (e.g., conversation management system 120) to both ask for information from the user and interpret received information from the user via a spoken exchange. In some other implementations, the recommendation may include a link to a voice bundle stored in the voice bundles repository 142 that has not been installed on the client device 110. In some implementations, the recommendation may include other contextual information related to the user, such as time or location information for presenting the recommendation.

Figure 2:
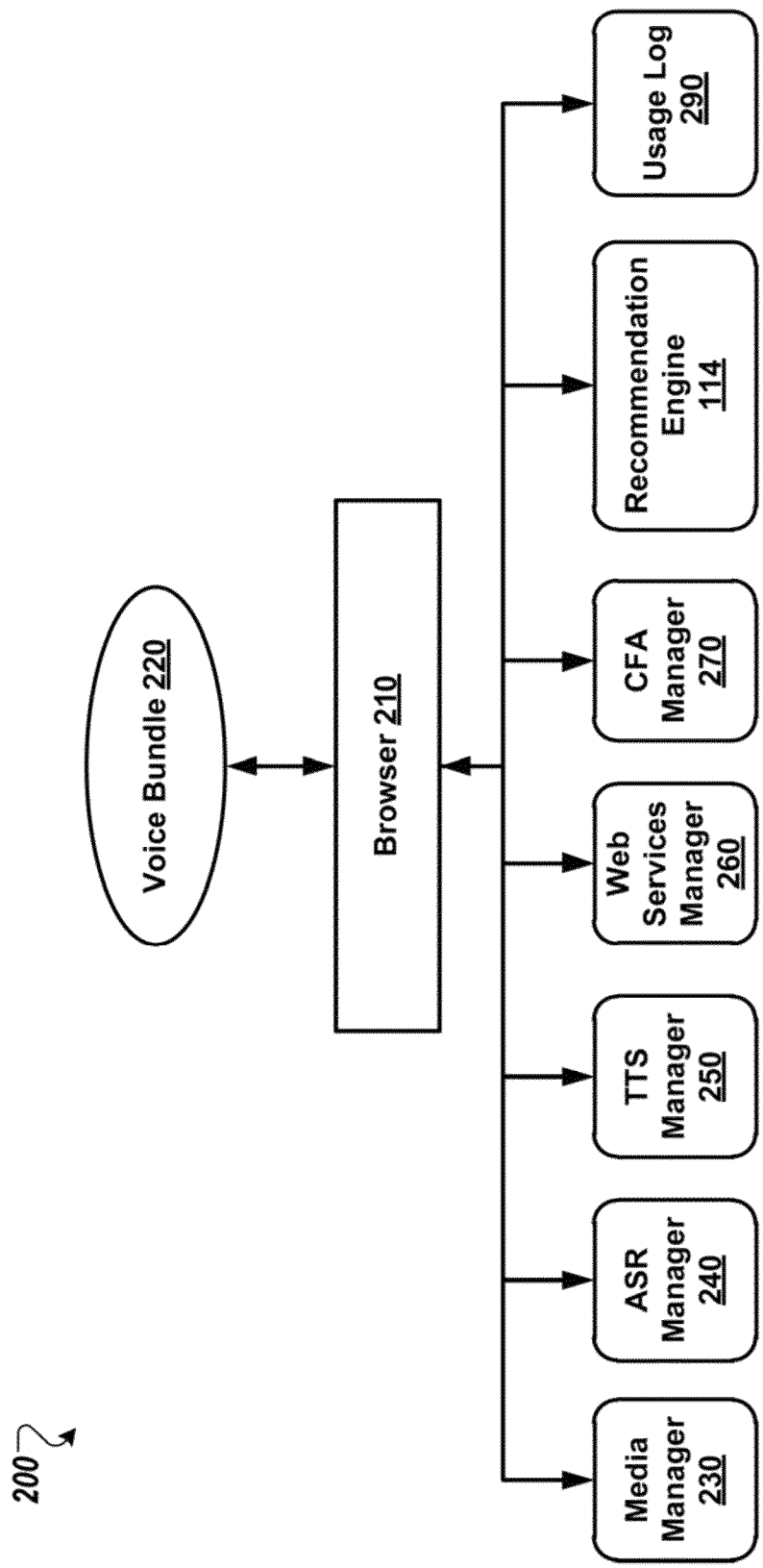
FIG. 2 illustrates an exemplary architecture for an electronic conversation assistant on an electronic device.

FIG. 2 illustrates an exemplary architecture 200 for an electronic conversation assistant on an electronic device. The architecture 200 may be the architecture of the conversation assistant 112 on client device 110. However, in other implementations, the architecture 200 may correspond to a different conversation assistant. The example below describes the architecture 200 as implemented in the communications system 100. However, the architecture 200 also may be implemented in other communications systems or system configurations.

The conversation assistant 112 includes a browser 210 that interfaces a voice bundle 220 with a media manager 230, an ASR manager 240, a TTS manager 250, a web services manager 260, a CFA manager 270, a recommendation engine 114, and a usage log 290. The browser 210 examines the voice bundle 220 and triggers actions performed by the conversation assistant 112 based on information included in the voice bundle 220. For example, the browser 210 may be a SCXML browser that interprets and executes SCXML content in the voice bundle 220. In order to interpret and execute the content of the voice bundle 220, the browser 210 calls upon the functionality of one or more of the media manager 230, ASR manager 240, TTS manager 250, web services manager 260 and CFA manager 270. The voice bundle 220 may be a voice bundle that is available on the voice bundles repository 142. The voice bundle 220 may have been downloaded by the client device 110 and locally stored, e.g., in memory coupled to the client device 110, such that the voice bundle is readily available to the conversation assistant 112. While only one voice bundle 220 is shown, the conversation assistant 112 may include multiple voice bundles that are stored on the client device and executed by the conversation assistant 112 (e.g., simultaneously or sequentially). The content of each voice bundle is interpreted and executed using the browser 210. User interactions with the browser 210 and the voice bundle 220 may be stored in the usage log 290.

The conversation assistant 112 may download voice bundles as needed, based upon selection by the user from the voice marketplace or based upon the user's responses to the recommendation engine 114 when the recommendation engine 114 proactively presents a voice bundle 220 to the user of the electronic device. The user also may delete, through the conversation assistant 112, voice bundles that are locally stored.

The media manager 230 is a component of the conversation assistant 112 that mediates the playing of sound files and the displaying of images during the execution of a flow. For example, the conversation assistant 112 may perform voice and text-based interaction with the user of the client device 110 based on a flow indicated by voice bundle 220. The flow may include an instruction for playing an audio file included in the voice bundle 220. When the conversation assistant 112 executes the instruction, the browser 210 invokes the media manager 230 for playing the audio file.

The ASR manager 240 is a component of the conversation assistant 112 that mediates the interaction between the browser 210 and a speech recognition resource. For example, the flow indicated by voice bundle 220 may include an instruction to listen for and interpret a spoken response from the user in accordance with a grammar included or specified by the voice bundle 220. Execution of the instruction may trigger the browser 210 to access a speech recognition resource via communications with the ASR manager 240. The speech recognition resource may be embedded in the conversation assistant 112 (that is, stored in the client device 110 and readily accessible by the conversation assistant 112). Alternatively, the speech recognition resource may be in the ASR cloud 150, e.g., ASR engine 152.

The TTS manager 250 is a component of the conversation assistant 112 that mediates the interaction between the browser 210 and a TTS resource. The TTS resource may be embedded in the conversation assistant 112 or located in the TTS cloud 160, e.g., ASR engine 162.

The web services manager 260 is another component of the conversation assistant 112 that mediates the interaction between the browser 210 and external services. For example, the browser 210 may use the web services manager 260 to invoke scripts and services from a remote web site such as AMAZON™ and PAYPAL™. The web services manager 260 may return SCXML instructions from the remote web site for the conversation assistant 112. The remote web sites may be accessed through the web services cloud 170.

The CFA manager 270 is yet another component of the conversation assistant 112 that logs into the CFA reporting system, e.g., CFA 122. The CFA manager 270 may report on the execution of a flow, e.g., error conditions or diagnostic checks, which are written into logs in the CFA 122. The logs may later be examined by the enterprise and/or the developer of the voice bundle 220 to determine performance, identify errors, etc.

The usage log 290 is a component of the conversation assistant 112 that stores the interactions among the browser 210, other components of the conversation assistant 112 including the recommendation engine 114, and the voice bundle 220. In some implementations, the usage information may also store information associated with other applications running on the electronic device, such as calendar or contact list. The information stored on the usage log 290 may be transferred to the usage log 182 in the log cloud 180. In some implementations, the information may be transferred to the usage log 182 periodically. In some other implementations, the information may be transferred to the usage log 182 when the conversation assistant 112 initiates the information transfer based on one or more predetermined criteria.

Figure 3:
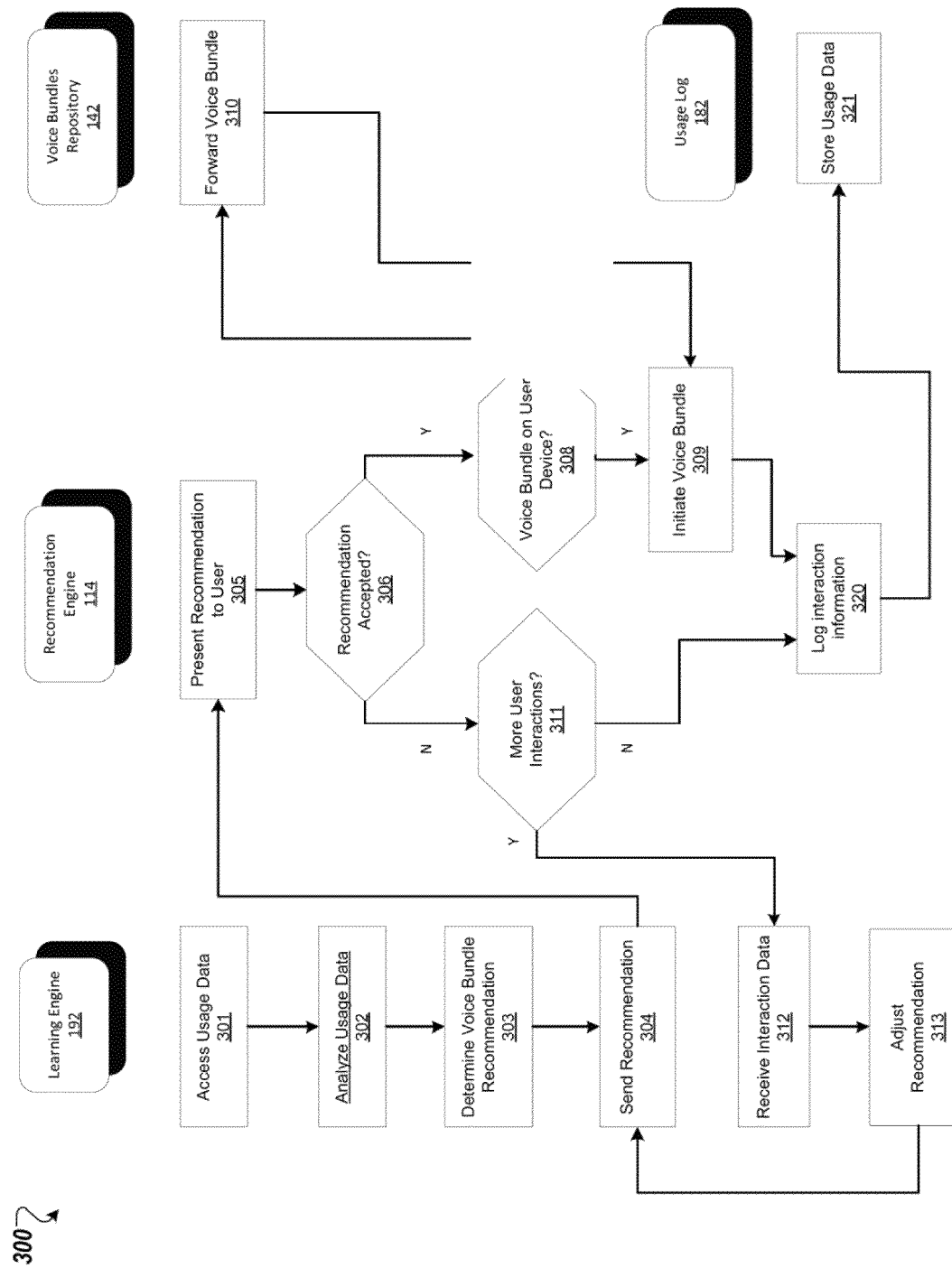
FIG. 3 illustrates a flow chart illustrating an example process for proactively recommending a voice bundle application to a user based on usage data.

FIG. 3 illustrates a flow chart illustrating an example process for proactively recommending a voice bundle application to a user based on usage data. In general, the process 300 analyzes usage data, provides a voice recommendation to the user, and interacts with the user of an electronic device through natural speech based on the recommendation. The process 300 will be described as being performed by a computer system comprising one or more computers, for example, the communication system 100 as shown in FIG. 1.

The learning engine 192 accesses usage data from the usage log 182 (301). In general, the usage log 182 stores usage data including information associated with the user of the client device 110, as authorized by the user. In some implementations, the learning engine 192 may access usage data stored within a specified period of time (e.g., usage data in the month of January, or usage data in the year of 2012). In some implementations, the learning engine 192 may access usage data associated with one or more non-voice based applications owned by the user (e.g., a calendar application on the electronic device). In some implementations, the learning engine 192 may access usage data associated with one or more voice bundles that the user has accessed in the past (e.g. a pizza-delivery-service voice bundle the user has used previously to order pizza). In some implementations, the learning engine 192 may access usage data associated with other users to compile usage data for a particular group of individuals (e.g., a group of individuals that have used the pizza-deliver-service voice bundle in the past month, or a group of individuals that have expressed interests in a particular service in their personal settings associated with their respective electronic devices).

The learning engine 192 analyzes the usage data to determine a recommendation to be presented to the user (302). As part of determining the recommendation, the learning engine 192 may analyze patterns in the usage data to identify a product or service likely to be of interest to the user. In some implementations, the learning engine 192 performs the analysis in the learning cloud 190. In some other implementations, the learning engine 192 performs the analysis in parallel with other servers in the learning cloud 190. In some other implementations, the learning engine 192 may be integrated with the CMS 120 and performs the analysis in the CMS 120.

Based on the analysis, the learning engine 192 determines a voice bundle recommendation to the user (303). For example, the learning engine 192 may determine a voice bundle that will enable the user to purchase or receive the product or service identified as being of likely interest to the user (e.g., a flower shop voice bundle would be recommended if it is determined that the user is likely interested in ordering flowers when the birthday of a loved one is approaching.) In some implementations, the recommendation may include one or more set of instructions for the recommendation engine 114. In some implementations, the recommendation may also include instructions to activate a voice bundle stored in the client device 110. In some other implementations, the recommendation may include a link to access a voice bundle stored in the voice bundles repository 142 that has not been installed on the client device 110. In some implementations, the recommendation may include other contextual information related to the user, such as time or location information for presenting the recommendation to the user.

The learning engine 192 sends the recommendation to the recommendation engine 114 (304). In some implementations, the learning engine 192 may send the recommendation upon determination of the voice bundle recommendation. In some other implementations, the learning engine 192 may store the recommendation, and provide the recommendation when the recommendation engine 114 queries for a recommendation.

The recommendation engine 114 presents the recommendation to the user of the electronic device (305). In general, the recommendation engine 114 presents the recommendation and interacts with the user by voice. The interaction may, for example, be a multi-step conversation that results in communication of the recommendation to the user via a spoken dialog between the conversation assistant 112 and the user. Notably, the recommendation may simply be a spoken offer by the recommendation engine 114 to help the user receive or purchase a product or service that is believed to likely be of interest to the user (e.g., "Today is your wife's birthday. Would you like to get some flowers for her?"). In some implementations, the recommendation may explicitly indicate to the user the connection between the recommendation and one or more particular voice bundle applications (e.g., "Today is your wife's birthday. Would you like me to launch the flower shop voice application to enable you to order flowers for her?"). While this type of recommendation is more technical than other recommendations that do not explicitly identify to the user the voice bundle application(s) implicated by the recommendation, this type of recommendation may be particularly useful in situations where the user is familiar with interacting with voice bundles and interacting with a voice bundle marketplace and, therefore, may find it useful to know which particular voice bundle will be launched by the recommendation engine 114 upon the user accepting the recommendation.

The user may also interact with the recommendation engine 114 by inputting texts on the electronic device. In some implementations, the recommendation engine 114 may present the recommendation to the user at specific time and place, as determined by the learning engine 192 based on the usage log 182. For example, the recommendation may contain instructions to provide a recommendation only if the recommendation engine 114 has determined that the electronic device is located at the user's home. The recommendation engine 114 may communicate with other components on the electronic device (e.g. GPS module, calendar, or sensors on the electronic device) to determine specific contexts associated with the user before presenting the recommendation. In some implementations, the recommendation engine 114 may present the recommendation to the user based on specific user-defined settings on the electronic device. For example, the recommendation engine 114 may delay presenting the recommendation if the user has turned the electronic device to silent mode. In some implementations, the recommendation engine 114 may alert the user (e.g. through silent vibrations) that a recommendation is available before presenting the recommendation to the user.

The recommendation engine 114 determines whether the recommendation has been accepted by the user (306). In general, the user communicates and reacts to the recommendation with the conversation assistant 112 in a conversational manner. If the recommendation engine 114 determines that the user has accepted the recommendation, the recommendation engine 114 determines whether the voice bundle associated with the recommendation has been installed on the user's electronic device (308). If the voice bundle has been installed on the user's electronic device, the recommendation engine 114 initiates execution of the voice bundle (309), and the voice bundle interacts with the user in the same manner as if the user had initiated execution of the voice bundle manually by herself.

For example, when the client device 110 includes a touch screen, a user of the client device 110 may be presented with a GUI that displays a different graphical element or icon for each voice bundle application. The user may touch the touch screen at the location of the screen at which a particular voice bundle graphical element or icon is displayed to select and/or launch the corresponding voice bundle application. The recommendation engine 114 provides an alternative way to select and launch voice bundles that includes automatically analyzing usage data for the user, automatically selecting one or more voice bundle applications to recommend to the user based on the results of the analysis, and then, through a spoken dialog with the user, automatically presenting a corresponding voice bundle recommendation to the user and automatically launching the one or more selected voice bundle applications in response to the user accepting the recommendation. The subsequent interactions between the user and the voice bundle may be stored at the usage log 290 on the electronic device (320), and then transferred to the usage log 182 in the log cloud 180 at a later time (321).

If the recommendation engine 114 determines that the voice bundle has not been installed on the user's electronic device, the recommendation engine 114 forwards the voice bundle to the user for installation (310). Once the user has installed the voice bundle, the voice bundle is initiated (309). The interactions between the user and the voice bundle may be stored at the usage log 290 on the electronic device (320), and then transferred to the usage log 182 in the log cloud 180 at a later time (321).

If the recommendation engine 114 determines that the user has declined the recommendation, the recommendation engine 114 determines whether the user has provided additional instructions associated with the recommendation (311). In some implementations, the recommendation engine 114 may communicate with the ASR manager 240 or the TTS manager 250 on the client device to determine the content and/or the context of the user's feedback.

If the recommendation engine 114 determines that the user has provided additional instructions associated with the recommendation, the recommendation engine 114 sends the instructions to the learning engine 192 (312). In some implementations, the learning engine 192 may communicate with the ASR engine 152 or the TTS engine 162 to determine the content and/or context of the user's feedback. Based on the received user feedback and/or the usage data stored at the usage log 182, the learning engine 192 adjusts the recommendation (313). In some implementations, the learning engine 192 may determine one or more updated voice bundle recommendations for the recommendation engine 114. In some implementations, the learning engine 192 may determine that no voice bundle recommendation is available in the voice cloud 140. The learning engine 192 sends the adjusted recommendation to the recommendation engine 114 (304), and the recommendation engine continues the interactions with the user (305).

If the recommendation engine 114 determines that the user has not provided additional instructions associated with the recommendation, or if the user has requested to terminate the interactions, the interactions between the user and the recommendation engine 114 may be stored at the usage log 290 on the electronic device (320), and then transferred to the usage log 182 in the log cloud 180 at a later time (321).

FIGS. 4A-4F are illustrations of an exemplary device 400 displaying a series of screenshots of a GUI 410 of a proactive conversation assistant performing a voice-based interaction, and where a generic voice bundle is initiated upon interaction with the user. The device 400 may be similar to the client device 110 such that the GUI 410 may represent the GUI of the conversation assistant 112. However, in other implementations, the device 400 may correspond to a different device. The example below describes the device 400 as implemented in the communications system 100. However, the device 400 also may be implemented in other communications systems or system configurations. In addition, the process of determining and receiving the recommendation, the communication between the recommendation 114 and the learning engine 192, and the interactions between the conversation assistant 112 and the user, as described in this example, may follow the example flow 300. However, in other implementations, the sequence of the flow or the components involved may be different from the example flow 300.

In some implementations, the conversation assistant 112 may have two modes of communication with the user of device 400—"talk" mode and "write" mode. In talk mode, the microphone button 412 is displayed in the bottom center of the GUI 410 and the write button 414 is displayed in one corner. The user may switch from the talk mode to the write mode by selecting the write button 414, e.g., by touching a section of the display proximate to the write button 414 using a control object.

The microphone button 412 is used by the user to talk to the conversation assistant 112. The conversation assistant 112 may use text-to-speech to 'speak' to the user. In addition, the conversation assistant 112 may transcribe the words that it speaks to the user, as shown by the transcription 401.

In some implementations, if the user clicks on the 'microphone' button while conversation assistant 112 is not already "listening", i.e., it is not in talk mode, conversation assistant 112 will switch to talk mode and, upon completing the switch, may play a distinct sound prompt to indicate that conversation assistant 112 is ready to accept speech input from the user. If the user clicks on the 'microphone' button while conversation assistant 112 is in talk mode, the 'microphone' button may have a distinct animation to indicate that conversation assistant 112 is listening and ready for the user to talk.

In some implementations, the conversation assistant 112 commences processing what the user said after a finite pause having a predetermined duration (e.g., 2 seconds) or if the user clicks on the microphone button 412 again. When the conversation assistant 112 starts to process what the user said, conversation assistant 112 may play a different but distinct sound prompt indicating that conversation assistant 112 is processing the user's spoken words. In addition, or as an alternative, the microphone button 412 may show a distinct animation to indicate that conversation assistant 112 is processing what the user said. In some implementations, when the conversation assistant 112 starts to process what the user said, the user may stop the processing by clicking on the microphone button 412 one more time.

In some implementations, after the conversation assistant 112 starts to listen, if the user does not say anything for a pre-determined period of time (that is, there is no input from the user during the predetermined period of time, e.g., 6 seconds), the conversation assistant 112 may play a distinct sound prompt to indicate that the conversation assistant 112 is going to stop listening, that is, go into idle mode. Subsequently, conversation assistant 112 may go into idle mode and stop listening.

Once the conversation assistant 112 successfully processes the user speech, the words spoken by the user are transcribed and displayed on the GUI 410, e.g., using the transcription 402. The user may be able to select the transcribed speech, edit the words using a keyboard 420 displayed on the GUI 410, and resubmit the speech. In some implementations, only the most recent transcribed speech by the user may be editable.

Referring to the interaction flow illustrated by the series of screenshots in FIGS. 4A-4F, the learning engine 192 determines a recommendation for the user of the device 400 based on calendar information and past voice bundle usage stored in the usage log 182, and sends the voice bundle recommendation to the recommendation engine 114. In this particular example, the voice bundle is a flower shop voice bundle, and the context is the birthday of the user's wife. When the recommendation engine 114 receives a voice bundle recommendation from the learning engine 192, the conversation assistant 112 says to the user, 'Today is your wife's birthday. Would you like to get some flowers for her?', as displayed in transcription 401 and shown in FIG. 4A. In some implementations, the recommendation engine 114 may have received and stored the recommendation from the learning engine 192 prior to the birthday of the user's wife, and may only present the recommendation on the day of. In some implementations, the question phrase 401 may be determined by the learning engine 192 and may be sent together with the recommendation. In some other implementations, the question phrase 401 may be determined by the recommendation engine 114 or other components on the conversation assistant 112.

Figure 4B:
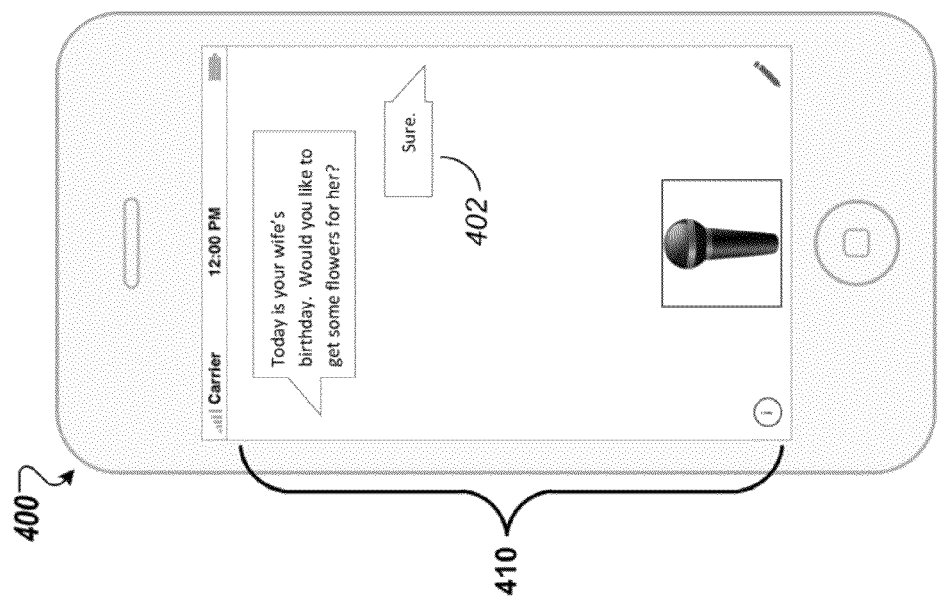
Figure 4C:
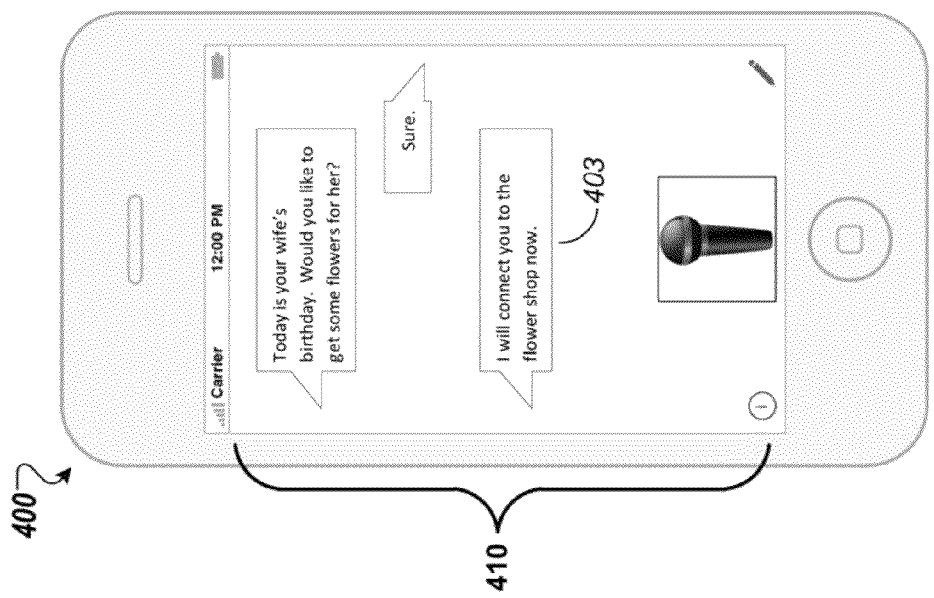

In this particular example, the user says 'Sure.' Once the conversation assistant 112 has successfully processed the user speech, the transcribed speech is displayed in transcription 402, as shown in FIG. 4B. Notably, in the implementations shown in FIGS. 4B-4F, the transcribed speech of the conversation assistant 112 is distinguished from the transcribed speech of the user through use of different respective conversation clouds, with the user's transcribed speech being displayed in conversation clouds that always point to one edge (e.g., the right edge) of the GUI 410 and the conversation assistant's transcribed speech being displayed in conversation clouds that always point to a different edge (e.g., the left edge) of the GUI 410.

After the user says "Sure," the conversation assistant 112 executes the flower shop voice bundle. In this particular example, the voice bundle has been installed on the device 400, and the conversation assistant 112 executes the voice bundle directly from the device 400. The conversation assistant 112 responds to the user by saying 'I will connect you to the flower shop now', as displayed in transcription 403 in FIG. 4C. In some implementations, the recommendation engine 114 may store the acceptance in the usage log on the device 400, and may enter an idle or power-saving state once the voice bundle has been executed.

Upon executing the voice bundle associated with the flower shop, an icon 416 may appear on the GUI 410 to show the user that he is interacting with the voice bundle. In this particular example, the recommendation engine 114 did not provide any data associated with the user to the voice bundle, and the voice bundle is running as a "generic" voice bundle without any contextual data associated with the event. That is, the voice bundle is running as if the user had manually selected and launched the voice bundle application through, for example, manual interactions with a GUI of the client device 110 (e.g., by manually selecting a graphical element or icon corresponding to the application displayed by a desktop display or by a voice bundle marketplace display). When running as a "generic" voice bundle, interactions with the user commence at the standard starting point of the call flow of the voice bundle. For example, the flower shop voice bundle may begin its interactions with the user at its standard call flow starting point by asking 'Welcome to the flower shop. How may I help you?', as shown in transcription 405 in FIG. 4D.

Here, the user responds by saying 'I would like to order a dozen roses,' as shown in transcription 406 in FIG. 4E. Based on the user inputs, the voice bundle continues to interact with the user according to the flow as configured on the respective voice site. At the end of the transaction, the voice bundle completes the interactions by saying to the user 'Transaction completed. Thank you!', as shown in transcription 407 in FIG. 4F. In some implementations, the interactions between the user and the voice bundle may be stored at the usage log on the device 400, and then transferred to the usage log 182 in the log cloud 180 at a later time.

FIGS. 5A-5F are illustrations of an exemplary device 500 displaying a series of screenshots of a GUI 510 of a proactive conversation assistant performing voice-based interactions, and where a voice bundle has been preloaded with contextual data associated with the user. The device 500 may be similar to the client device 110 such that the GUI 510 may represent the GUI of the conversation assistant 112. However, in other implementations, the device 500 may correspond to a different device. The example below describes the device 500 as implemented in the communications system 100. However, the device 500 also may be implemented in other communications systems or system configurations. In addition, the process of determining and receiving the recommendation, the communication between the recommendation 114 and the learning engine 192, and the interactions between the conversation assistant 112 and the user, as described in this example, may follow the example flow 300. However, in other implementations, the sequence of the flow or the components involved may be different from the example flow 300.

Referring to the interaction flow illustrated by the series of screenshots in FIGS. 5A-5F, the learning engine 192 determines a recommendation for the user of the device 500 based on calendar information and past voice bundle usage stored in the usage log 182, and sends the voice bundle recommendation to the recommendation engine 114. In this particular example, the voice bundle is a flower shop voice bundle, and the context is Valentine's Day celebration with the wife of the user. When the recommendation engine 114 receives a voice bundle recommendation from the learning engine 192, the conversation assistant 112 says to the user, 'Today is Valentine's Day. Would you like to get some flowers for your wife?', as displayed in transcription 501 and shown in FIG. 5A.

Figure 5A:
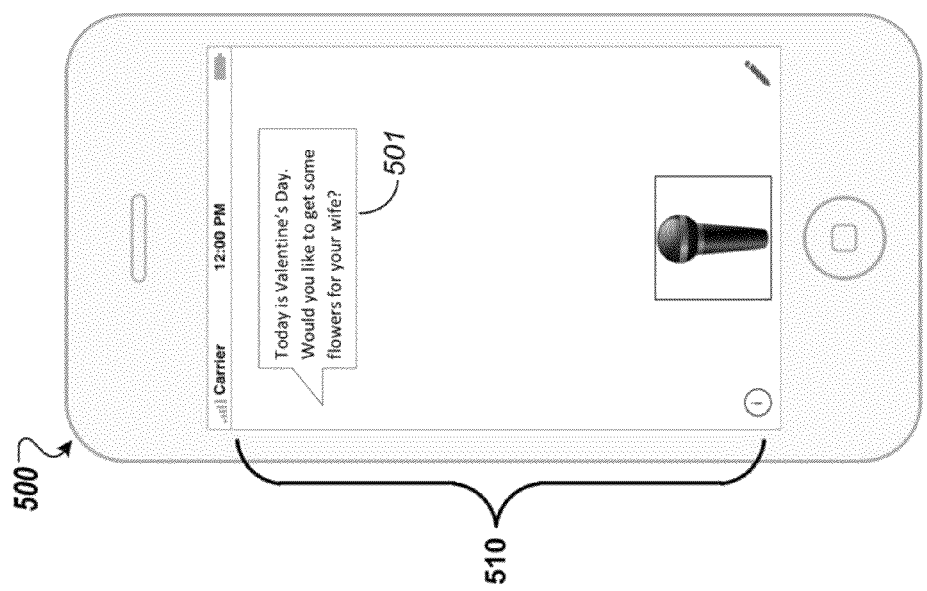
FIGS. 5A-5F are illustrations of an exemplary device displaying a series of screenshots of a GUI of a proactive conversation assistant performing voice-based interactions, and where a voice bundle has been preloaded with contextual data associated with the user.
Figure 5B:
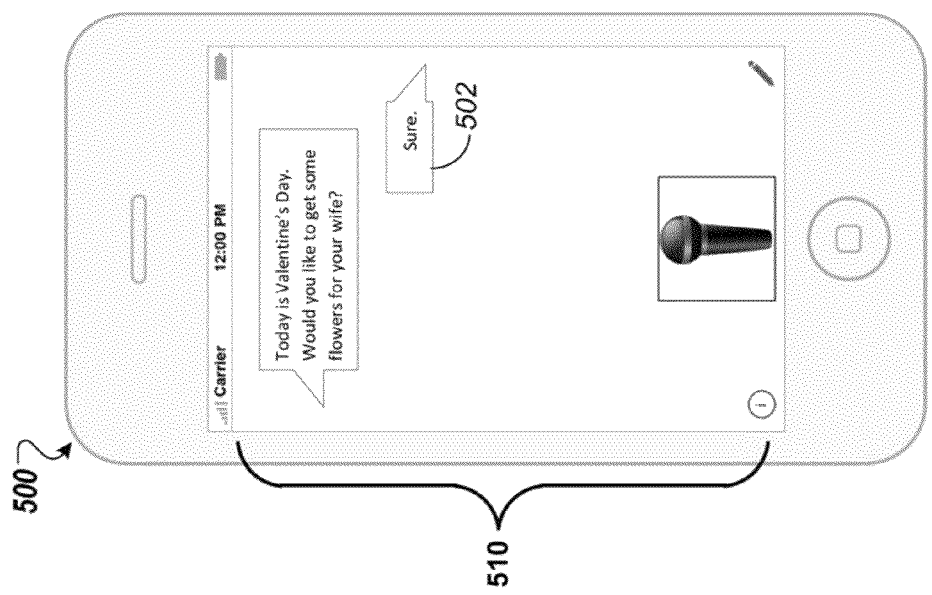

In this particular example, the user says 'Sure.' Once the conversation assistant 112 has successfully processed the user speech, the transcribed speech is displayed in transcription 502, as shown in FIG. 5B. After the user says "Sure," the conversation assistant 112 executes the flower shop voice bundle. In this particular example, the voice bundle has been installed on the device 500, and the recommendation engine 114 executes the voice bundle directly from the device 500. In this particular example, the conversation assistant 112 also provides additional contextual data related to this event to the voice bundle (e.g. "Valentine's Day", "user's wife", and previous purchase history). In some implementations, the recommendation engine 114 may provide the user's credentials to the voice bundle, and the voice bundle would retrieve information stored at the usage log of the third party vendor that developed the voice bundle.

Figure 5C:
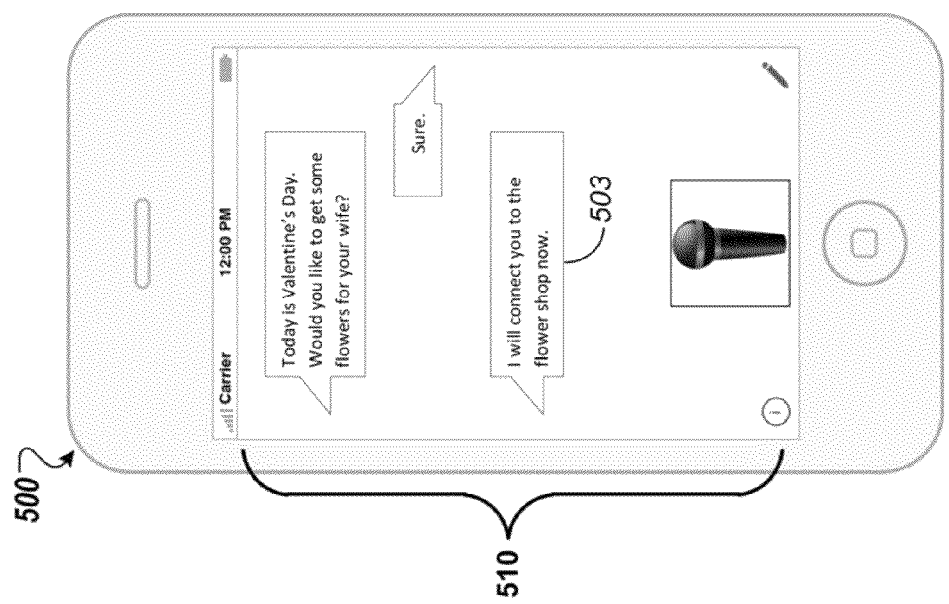
Figure 5D:
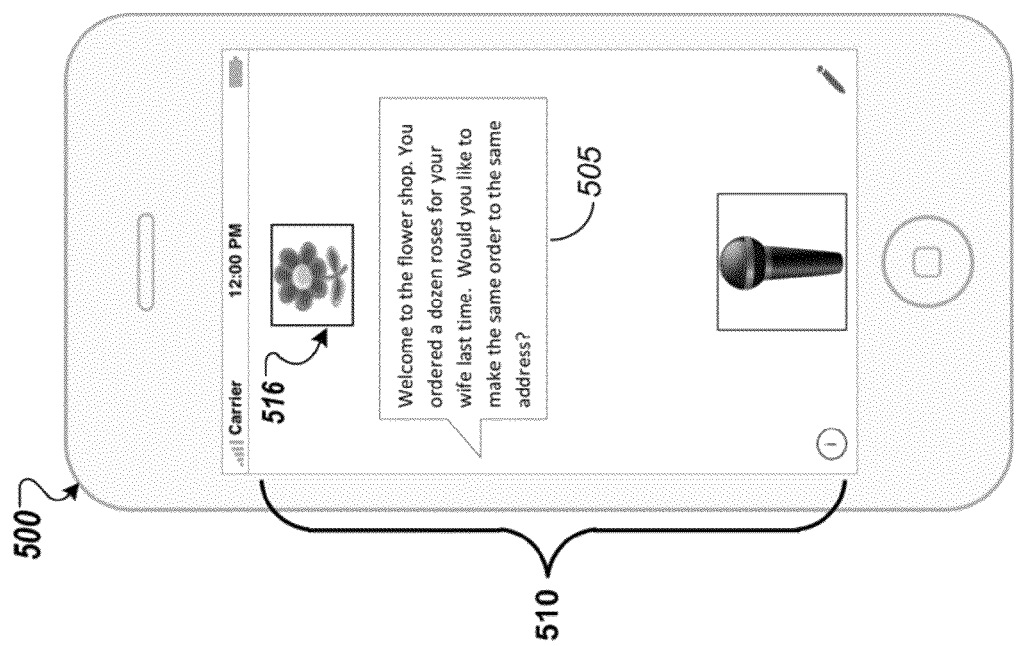

The conversation assistant 112 responds to the user by saying 'I will connect you to the flower shop now', as displayed in transcription 503 in FIG. 5C. In some implementations, the recommendation engine 114 may store the acceptance in the usage log on the device 500, and may enter an idle or power-saving state after the voice bundle has been executed.

Figure 4D:
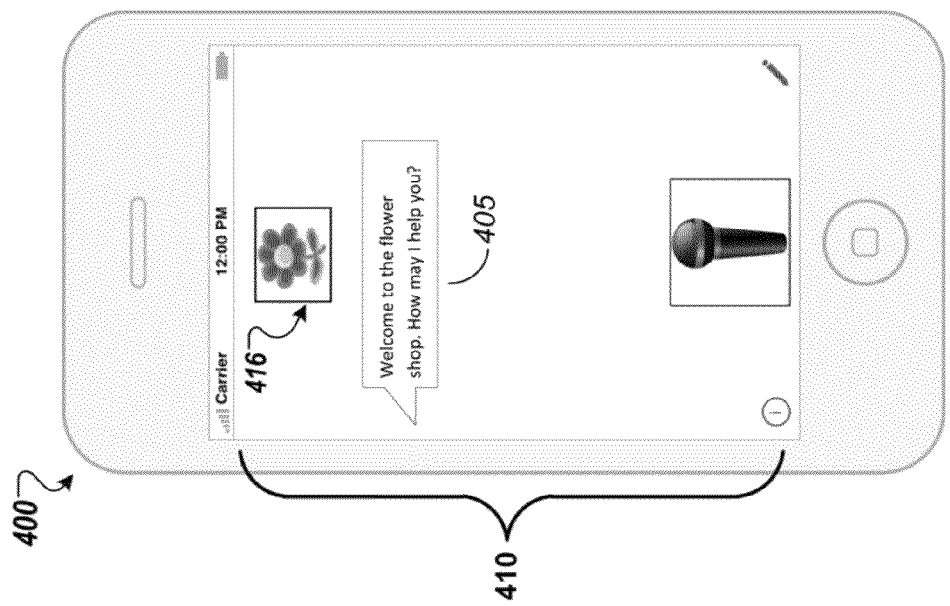
Figure 4F:
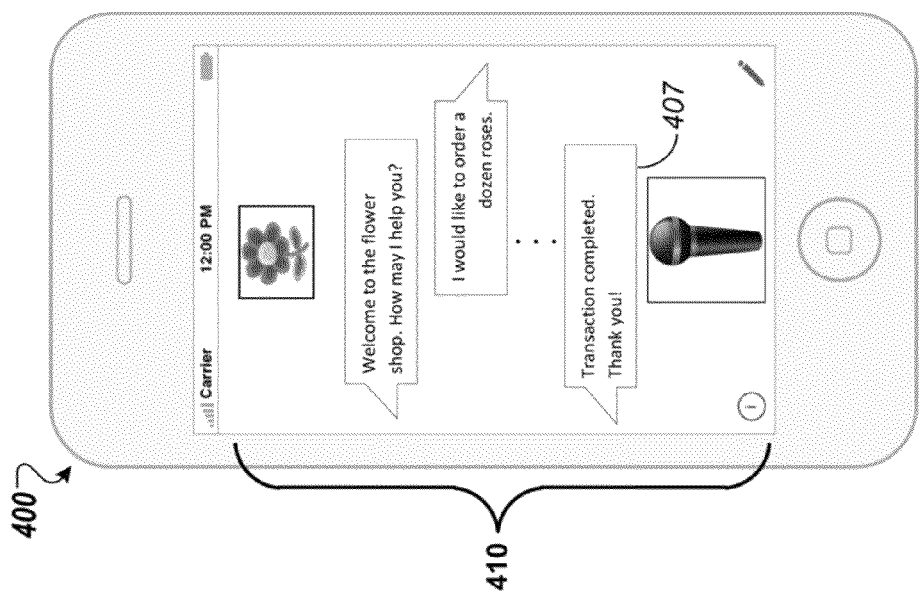

Upon executing the voice bundle associated with the flower shop, an icon 516 may appear on the GUI 510 to show the user that he is interacting with the voice bundle. In this particular example, the recommendation engine 114 provided contextual data associated with the user to the voice bundle, and the voice bundle is running as a "preloaded" voice bundle. That is, the voice bundle is preloaded with contextual data that allows it to modify the call flow by, for example, changing the standard starting point to a new starting point based on the contextual data received from the conversation assistant 112. For example, the voice bundle may execute branching logic to bypass various prompts and grammars as being no longer relevant or as being unlikely relevant to the caller's needs in view of the received contextual information (e.g., the voice bundle may bypass prompting the user to identify a type of flower and/or a delivery address when the type of flower and the delivery address have already been provided as contextual information by the conversation assistant 112). Additionally or alternatively, the preloading of the voice bundle with contextual data may result in modification of the various prompts and/or grammars of the call flow to be more tailored to the context corresponding to the received contextual information (e.g., the prompt "Welcome to the flower shop." may be changed to the prompt "Welcome to the flower shop. Happy 20th Wedding Anniversary!"). In the example shown in FIG. 5D, the standard starting point of the call flow is changed from executing the prompt "Welcome to the flower shop. How may I help you?" (as shown in FIG. 4D) to a new starting point corresponding to execution of a prompt that leverages the received contextual data "Welcome to the flower shop. You ordered a dozen roses for your wife last time. Would you like to make the same order to the same address?', as shown in transcription 505 in FIG. 5D.

Figure 5E:
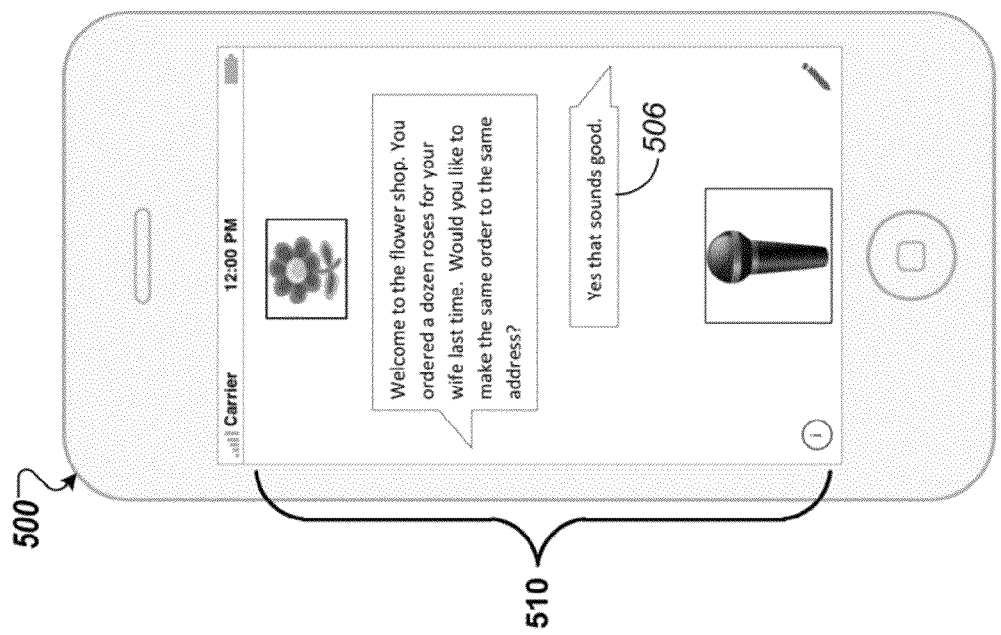
Figure 5F:
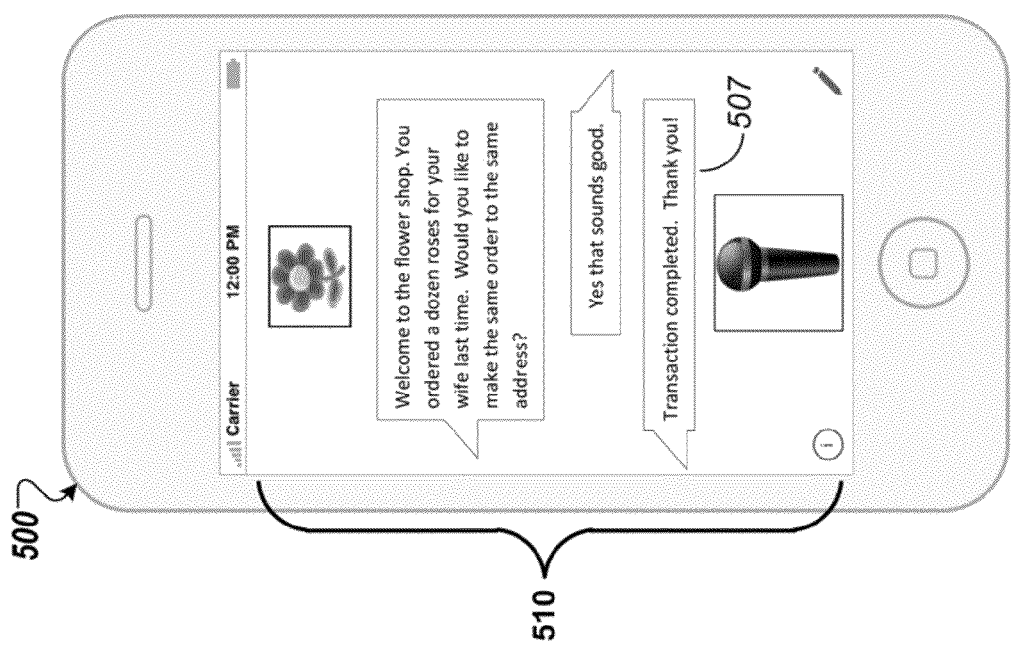

Here, the user responds by saying 'Yes that sounds good,' as shown in transcription 506 in FIG. 5E. Based on the user inputs, the voice bundle would continue to interact with the user according to the flow as configured on the respective voice site. At the end of the transaction, the voice bundle completes the interactions by saying to the user 'Transaction completed. Thank you!', as shown in transcription 507 in FIG. 5F. In some implementations, the interactions between the user and the voice bundle may be stored at the usage log on the device 500, and then transferred to the usage log 182 in the log cloud 180 at a later time.

FIGS. 6A-6F are illustrations of an exemplary device 600 displaying a series of screenshots of a GUI 610 of a proactive conversation assistant performing voice-based interactions, and where a different voice bundle with contextual data is installed and initiated upon interactions with the user. The device 600 may be similar to the client device 110 such that the GUI 610 may represent the GUI of the conversation assistant 112. However, in other implementations, the device 600 may correspond to a different device. The example below describes the device 600 as implemented in the communications system 100. However, the device 600 also may be implemented in other communications systems or system configurations. In addition, the process of determining and receiving the recommendation, the communication between the recommendation 114 and the learning engine 192, and the interactions between the conversation assistant 112 and the user, as described in this example, may follow the example flow 300. However, in other implementations, the sequence of the flow or the components involved may be different from the example flow 300.

Referring to the interaction flow illustrated by the series of screenshots in FIGS. 6A-6F, the learning engine 192 determines a recommendation for the user of the device 600 based on calendar information and past voice bundle usage stored in the usage log 182, and sends the voice bundle recommendation to the recommendation engine 114. In this particular example, the voice bundle is a flower shop voice bundle, and the context is birthday celebration with the wife of the user. When the recommendation engine 114 receives a voice bundle recommendation from the learning engine 192, the conversation assistant 112 says to the user, 'Today is your wife's birthday. Would you like to get some flowers for her?', as displayed in transcription 601 and shown in FIG. 6A.

Figure 6A:
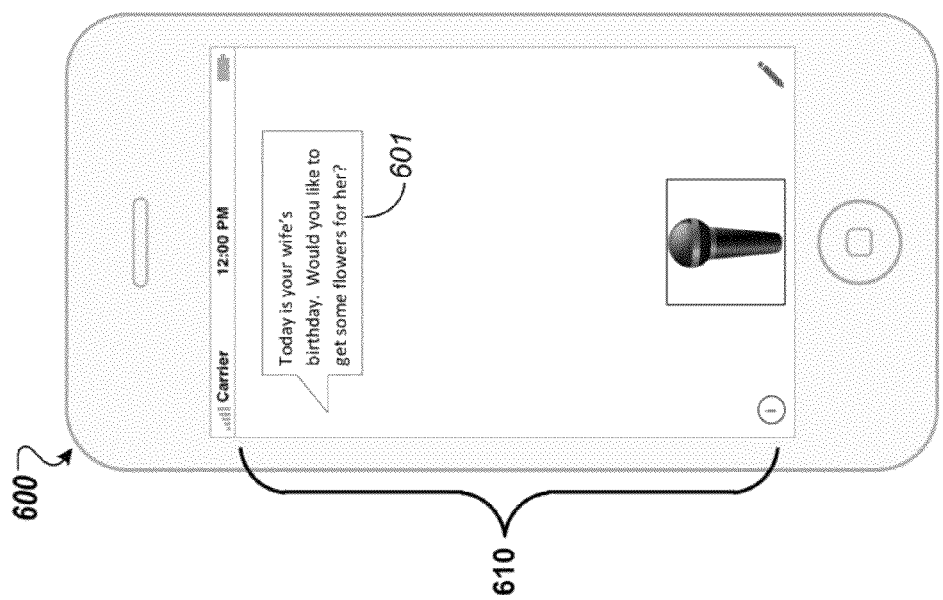
FIGS. 6A-6F are illustrations of an exemplary device displaying a series of screenshots of a GUI of a proactive conversation assistant performing voice-based interactions, and where a different voice bundle with contextual data is installed and initiated upon interactions with the user.
Figure 6B:
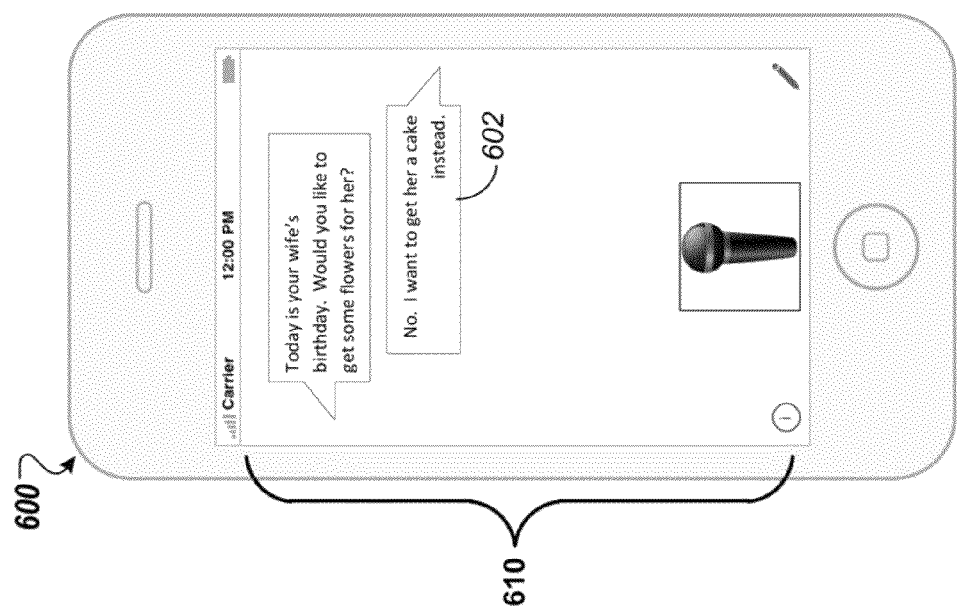
Figure 6C:
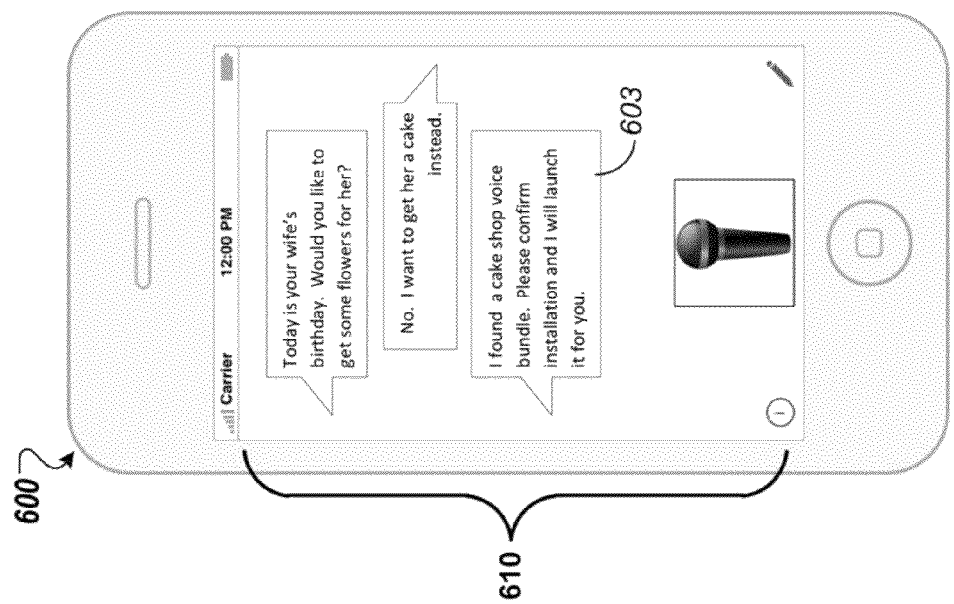
Figure 6D:
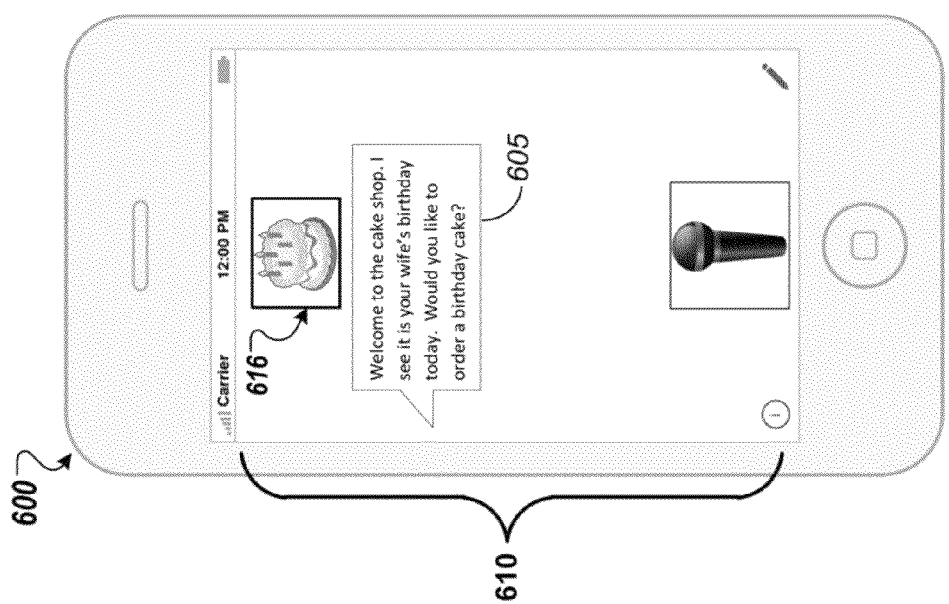

In this particular example, the user decides that he would like to send a cake instead of flowers, and says 'No. I want to get her a cake instead.' Once the conversation assistant 112 has successfully processed the user speech, the transcribed speech is displayed in transcription 602, as shown in FIG. 6B. In some implementations, the conversation assistant 112 may interpret the response 602 to determine what the user wants.

For example, the conversation assistant 112 may use the ASR manager 142 to leverage speech recognition resources that perform natural language processing on the user's response. The ASR results can then be used by the conversation assistant 112 to determine whether the response 602 indicates an acceptance of the recommendation, a rejection of the recommendation because the user has no current need for a product or service, or a rejection of the recommendation because the user has a need for a product or service that is different from that corresponding to the recommendation. In some implementations, the conversation assistant 112 may send the response 602 and/or all or part of the ASR results to the learning engine 192 and/or to the CMS 120 and the learning engine 192 and/or the CMS 120 processes the response 602 and/or all or part of the ASR results to determine whether the response 602 indicates an acceptance of the recommendation, a rejection of the recommendation because the user has no current need for a product or service, or a rejection of the recommendation because the user has a need for a product or service that is different from that corresponding to the recommendation If the user response indicates user acceptance of the recommendation, then the conversation assistant 112 may execute the corresponding one or more voice bundles as described previously with respect to, for example, FIGS. 3, 4A-4F and 5A-5F. Alternatively, if the response indicates user acceptance of the recommendation, the conversation assistant 112 may then present an adjusted recommendation to the user that asks for confirmation of or otherwise elicits a contextual detail that will allow the conversation assistant 112 to preload the one or more voice bundles with contextual information to, thereby, streamline the user's interactions with those voice bundles. An example of this process is described below with respect to FIGS. 8 and 9A-9D. As also described below with respect to FIGS. 8 and 9A-9D, the conversation assistant 112 may further ask the user to verbally specify the user's preferences with respect to whether and how the recommendation will be presented to the user again in the future.

If the response 602 indicates that the user is simply rejecting the recommendation and has no current need for a product or service, then conversation assistant 112 may respond, for example, as described below with respect to FIGS. 7A-7E. If, on the other hand, the response 602 is determined to indicate a different need than that addressed by the recommendation but the conversation assistant 112 is unable to identify the different need, the conversation assistant 112 may ask further clarifying questions to better discern the user's different need or may end the dialog with the user. If, however, the response 602 is determined to indicate a different need than that addressed by the recommendation and the conversation assistant 112 is able to identify the different need, the conversation assistant 112 may access an index of accessible voice bundle applications to attempt to identify one or more voice bundle applications deemed most likely able to satisfy the different need of the user as discerned from the user's response 602. In the example shown in FIG. 6B, the ASR results may indicate or may be further analyzed to determine that the user wants to purchase a cake instead of flowers. The conversation assistant 112 may then access a locally or remotely stored index of accessible voice bundle applications (e.g., an index stored in the voice bundles repository 142) to determine if an accessible voice bundle application enables the user to purchase a cake.

If the conversation assistant 112 identifies one or more accessible voice bundle applications as likely being able to satisfy the different need of the user as discerned from the user's spoken response 602, then the conversation assistant 112, through the recommendation engine 114, may present an adjusted recommendation to the user. In the example shown in FIG. 6B, the conversation assistant 112 may identify an accessible cake-shop voice bundle application as likely being able to satisfy the user's different need or desire to purchase a cake. The conversation assistant 112 may then present the following adjusted recommendation "Would you like me to launch a cake shop voice application that will allow you to order a cake?"

If, on the other hand, a different need of the user for a particular service or product is identified from the user's response 602 but no voice bundles are identified as likely being able to allow the user to satisfy the determined different need, the conversation assistant 112 may inform the user of the conversation assistant's inability to help the user and may, optionally, provide a default recommendation (which may or may not correspond to a default voice bundle application) that is not specific to the identified different need (e.g., "Unfortunately, I cannot find a voice bundle application related to model trains. However, if you wish, I can perform a Web search for model trains. Do you wish me to perform such a search?" or "Unfortunately, I cannot find a voice bundle application related to model trains. However, if you wish, I can call one of our information service operators who may be able to help you. Do you wish me to call one of our information service operators?").

The above-described implementation assumes that the conversation assistant 112 has the intelligence to analyze the results from the ASR processing of the user's response 602 to identify a different need of the user, to identify one or more accessible voice bundles as likely enabling the user to satisfy the identified different need, and then to present an adjusted recommendation corresponding to the identified one or more accessible voice bundles. Other implementations, however, may distribute one or more of these operations to other components of the system 100, thereby decreasing the processing demands on the client device 110 and centralizing control of the operations but possibly increasing processing delays as a result of communication delays between the client device 110 and the other components of the system 100.

Decreasing the processing demands on the client device 110 may be desirable when client devices 110 are mass market, low-cost devices that have relatively limited processing capabilities. Moreover, having one or more centralized servers or computers, rather than the client devices 110, perform the analysis operations may allow upgrades and changes to the software that performs these operations to occur more easily as such upgrades/changes are less likely to require mass distribution of software patches to the client devices 110. Additionally, having one or more central servers or computers, rather than the client devices 110, perform the analysis operations may allow the hardware that performs the operations to be upgraded/changed to improve performance, which is unlikely to be possible when the operations are performed by the client devices 110, which have a relatively fixed hardware configuration that is unlikely to be easily changeable.

In the implementation corresponding to process 300 of FIG. 3, for example, the learning engine 192, rather than the conversation assistant 112, analyzes the response 602 to identify a different need of the user, identifies one or more accessible voice bundles as likely enabling the user to satisfy the identified different need, and then instructs the recommendation engine 114 of the conversation assistant 112 to present an adjusted recommendation to the user responsive to the identified different need. In this implementation, the recommendation engine 114 of the conversation assistant 112 provides the user's response 602 or the ASR results corresponding to the user response 602 to the learning engine 192 (i.e., operation 311), and the learning engine 192, rather than the conversation assistant 112, analyzes the response/results using, for example, pattern recognition techniques to discern whether the response/results indicate a different need of the user for a product or service that is different from that addressed by the originally presented recommendation. If the learning engine 192 concludes that the response/results are more than simply a rejection of the originally presented recommendation and likely indicate a different need but the learning engine 192 is unable identify the different need, then the learning engine 192 may instruct the recommendation engine 114 to ask further clarifying questions (e.g., "I did not understand your last reply. Could you please repeat your answer?, and "Did you say that you are interested in purchasing a cake instead of flowers or are you interested in something else?") or to end the exchange. However, as shown in FIG. 3, if the learning engine 192 concludes that the response/results identify a different need for a product or service, the learning engine 192 may identify (or attempt to identify) one or more voice bundles as likely being able to help the user satisfy the identified different need and then may send an instruction to the recommendation engine 114 of the conversation assistant 112 to present an adjusted recommendation corresponding to the identified one or more accessible voice bundles to the user (i.e. operations 312, 313 and 304 of process 300). If a different need is identified from the response/results but no voice bundles are determined by the learning engine 192 as likely being able to enable the user to satisfy the identified different need, the learning engine 192 may instead instruct the recommendation engine 114 to inform the user of the conversation assistant's inability to help the user and may, optionally, provide a default recommendation that is not specific to the identified different need.

In some other implementations, the conversation assistant 112 may send the response 602 or ASR results to the CMS 120 to determine what the user wants. The CMS 120 may communicate with one or more of the other components of system 100 to analyze the response/results in a manner similar to that described above with respect to the learning engine 192.

In some implementations, the learning engine 192, the conversation assistant 112, or the CMS 120 identifies a different need of the user for a product or service simultaneously with identifying a voice bundle corresponding to the different need by simply, for example, determining if one or more accessible voice bundles appear to correspond to the words used in the user response (e.g., the words include "cake" and a "cake-shop" voice bundle is accessible). If the words do not correspond to an accessible voice bundle, the learning engine 192 or the conversation assistant 112 may simply treat the response as not corresponding to an identifiable different need for a product or service and may then, for example, end the dialog with the user by stating that the conversation assistant 112 is unable to help the user, may provide a default recommendation (e.g., a recommendation to perform a Web search or a recommendation to call an information service operator), or may ask further clarifying questions (based on, for example, taxonomies) in the hope of identifying an accessible voice bundle that may help the user (e.g., "You indicated an interest in model trains. Are you interested in toys?"). In some implementations, the further clarifying questions may be informed by the corpus of accessible voice bundles. For example, a clarifying yes/no question that directly asks about a different interest or different need may only be asked if one of the two answers yes or no directly results in identification of an accessible voice-bundle that is likely able to allow the user to satisfy the different need or different interest specified in the clarifying question.

In some implementations, the conversation assistant 112 analyzes ASR processing results corresponding to the response 602 to determine if any locally stored voice bundle applications (i.e., applications stored on the client device 110 itself) will likely enable the user to satisfy the identified different need. If the conversation assistant 112 is able to identify one or more locally stored voice bundle applications as responsive to the user's identified different need, then the conversation assistant 112 may provide an adjusted recommendation corresponding to the one or more identified voice bundle applications. However, if the conversation assistant 112 is unable to identify any such locally stored voice bundle applications, the conversation assistant 112 may send the response 602, some or all of the ASR processing results corresponding to the response 602, and/or information indicating the different need identified by the conversation assistant 112 as corresponding to the response 602 to the learning engine 192 for further analysis. The learning engine 192 may then determine whether any remote voice bundle applications (i.e., voice bundles not stored on the client device 110) that can be downloaded to the client device 110 are likely able to enable the user to satisfy the identified different need. If one or more remote voice bundle applications are identified as responsive to the identified different need by the learning engine 192, then the learning engine 192 may instruct the recommendation engine 114 to present an adjusted recommendation to the user that allows the user to download the corresponding one or more remote voice bundle applications to the client device 110 and then launch the downloaded one or more remote voice bundle applications. If the learning engine 192 is unable to identify one or more remote voice bundle applications that are both responsive to the user's different need and are capable of being downloaded to the client device 110, the learning engine 192 may instruct the recommendation engine 114 to inform the user of the conversation assistant's inability to help the user and may, optionally, provide a default recommendation that is not specific to the identified different need. Referring back to the particular example shown in FIGS. 6A-6F, the cake-shop voice bundle that addresses the different need of the user (i.e., to purchase a cake rather than flowers) has not been installed on the device 600, and, as a consequence, the conversation assistant 112 may prompt the user to install the voice bundle by asking 'I found a cake shop voice bundle. Please confirm installation and I will launch it for you.', as displayed in transcription 603 in FIG. 6C. In some implementations, the user may need to enter his credentials to proceed with the installation. Once the installation completes, the conversation assistant 112 executes the voice bundle on the device 600. In this particular example, the conversation assistant 112 also provides additional contextual data related to this event to the voice bundle (e.g. "birthday", "user's wife"). In some implementations, the recommendation engine 114 may store the acceptance in the usage log on the device 600, and may enter an idle or power-saving state after the voice bundle has been executed.

Upon executing the cake-shop voice bundle, an icon 616 may appear on the GUI 610 to show the user that he is interacting with the voice bundle. In this particular example, the recommendation engine 114 provided contextual data associated with the user to the voice bundle, and the voice bundle is running as a "preloaded" voice bundle. The voice bundle initiates the interactions by asking 'Welcome to the cake shop. I see it is your wife's birthday today. Would you like to order a birthday cake?', as shown in transcription 605 in FIG. 6D.

Figure 6E:
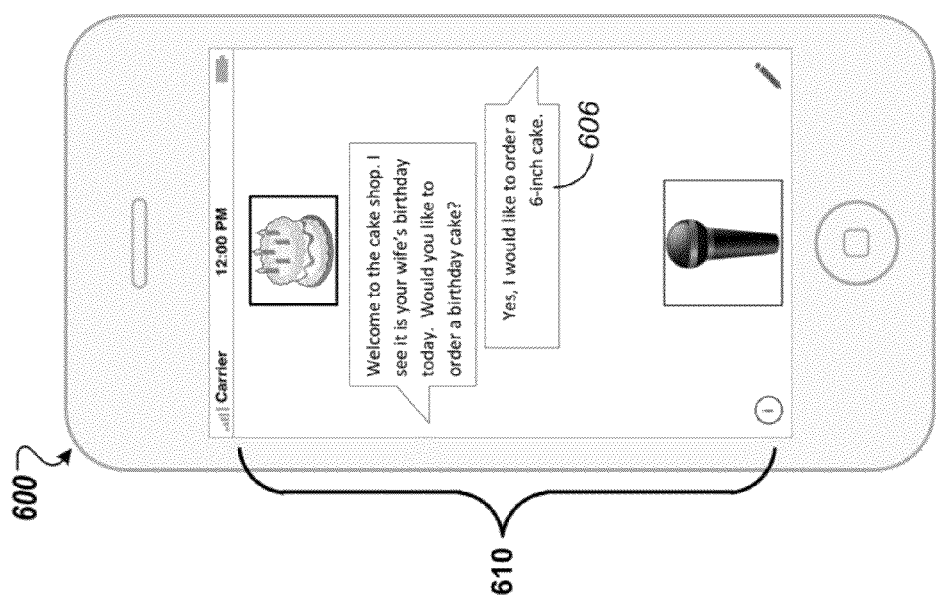
Figure 6F:
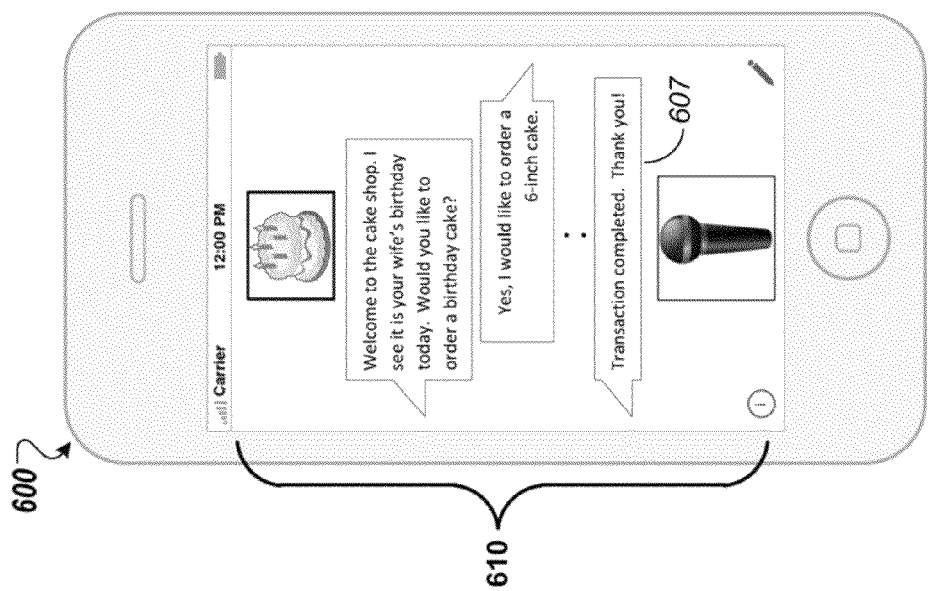

Here, the user responds by saying 'Yes, I would like to order a 6-inch cake,' as shown in transcription 606 in FIG. 6E. Based on the user inputs, the voice bundle would continue to interact with the user according to the flow as configured on the respective voice site. At the end of the transaction, the voice bundle completes the interactions by saying to the user 'Transaction completed. Thank you!', as shown in transcription 607 in FIG. 6F. In some implementations, the interactions between the user and the voice bundle may be stored at the usage log on the device 500, and then transferred to the usage log 182 in the log cloud 180 at a later time.

FIGS. 7A-7E are illustrations of an exemplary device displaying a series of screenshots of a GUI of a proactive conversation assistant performing voice-based interactions, where the user has declined the recommendation. The device 700 may be similar to the client device 110 such that the GUI 710 may represent the GUI of the conversation assistant 112. However, in other implementations, the device 700 may correspond to a different device. The example below describes the device 700 as implemented in the communications system 100. However, the device 700 also may be implemented in other communications systems or system configurations. In addition, the process of determining and receiving the recommendation, the communication between the recommendation 114 and the learning engine 192, and the interactions between the conversation assistant 112 and the user, as described in this example, may follow the example flow 300. However, in other implementations, the sequence of the flow or the components involved may be different from the example flow 300.

Referring to the interaction flow illustrated by the series of screenshots in FIGS. 7A-7F, the learning engine 192 determines a recommendation for the user of the device 700 based on calendar information and past voice bundle usage stored in the usage log 182, and sends the voice bundle recommendation to the recommendation engine 114. In this particular example, the voice bundle is a flower shop voice bundle, and the context is birthday celebration with the wife of the user. When the recommendation engine 114 receives a voice bundle recommendation from the learning engine 192, the conversation assistant 112 says to the user, 'Today is your wife's birthday. Would you like to get some flowers for her?', as displayed in transcription 701 and shown in FIG. 7A.

Figure 7A:
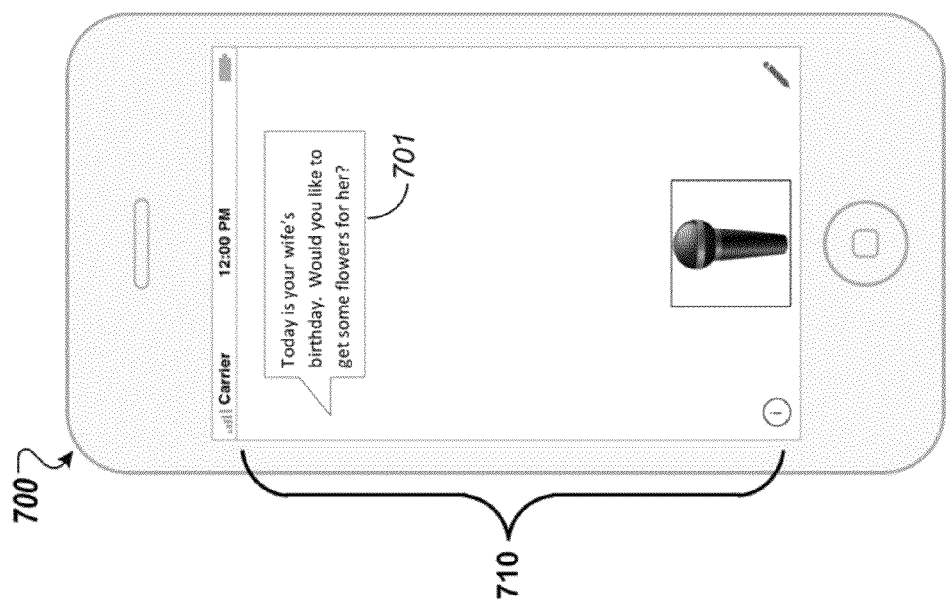
FIGS. 7A-7E are illustrations of an exemplary device displaying a series of screenshots of a GUI of a proactive conversation assistant performing voice-based interactions, where the user has declined the recommendation.
Figure 7B:
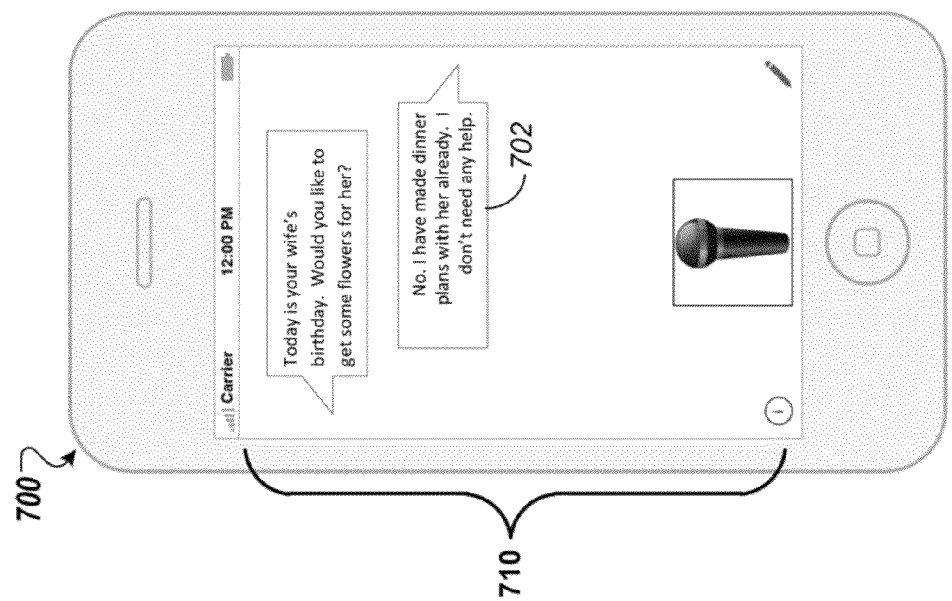
Figure 7C:
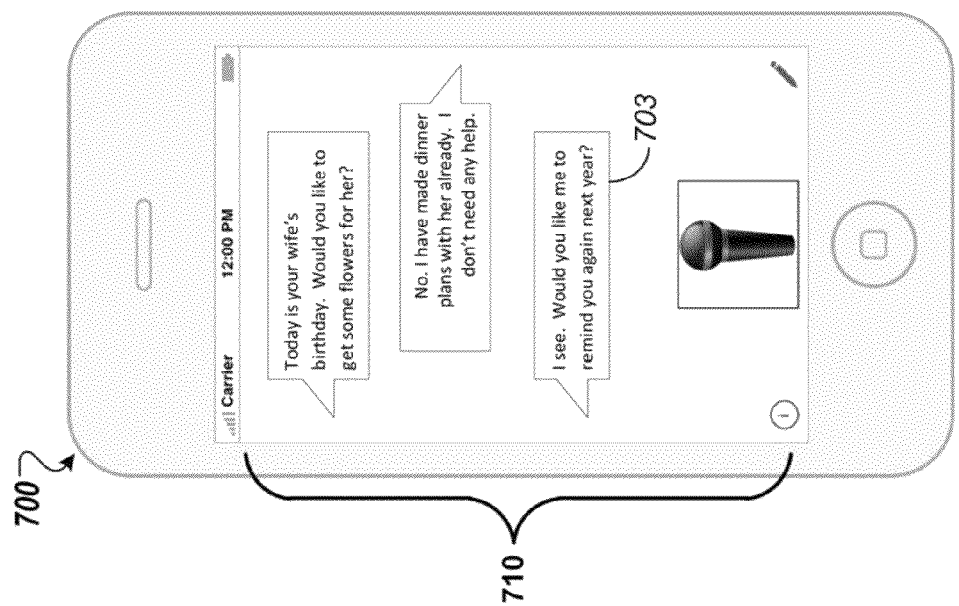

In this particular example, the user decides that he does not need flowers, and says 'No. I have made dinner plans with her already. I don't need any help.' Once the conversation assistant 112 has successfully processed the user speech, the transcribed speech is displayed in transcription 702, as shown in FIG. 7B. In some implementations, if the conversation assistant 112 determines that the user has declined the recommendation, the conversation assistant 112, alone or in combination with the learning engine 192 and or the CMS 120, may analyze the response 702 to determine what the user wants, as described in more detail above with respect to FIGS. 6A-6F. In this particular example, the conversation assistant 112 analyzes the user's response and determines that the user wants to terminate the voice interactions regarding this particular topic. The conversation assistant 112 may respond to the user by asking 'I see. Would you like me to remind you again next year?', as displayed in transcription 703 in FIG. 7C.

Figure 7D:
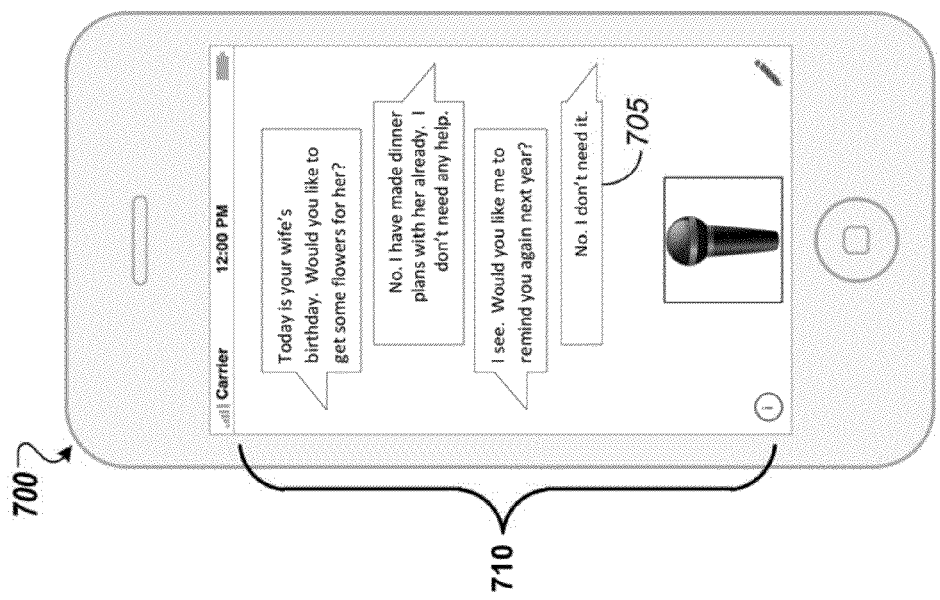
Figure 7E:
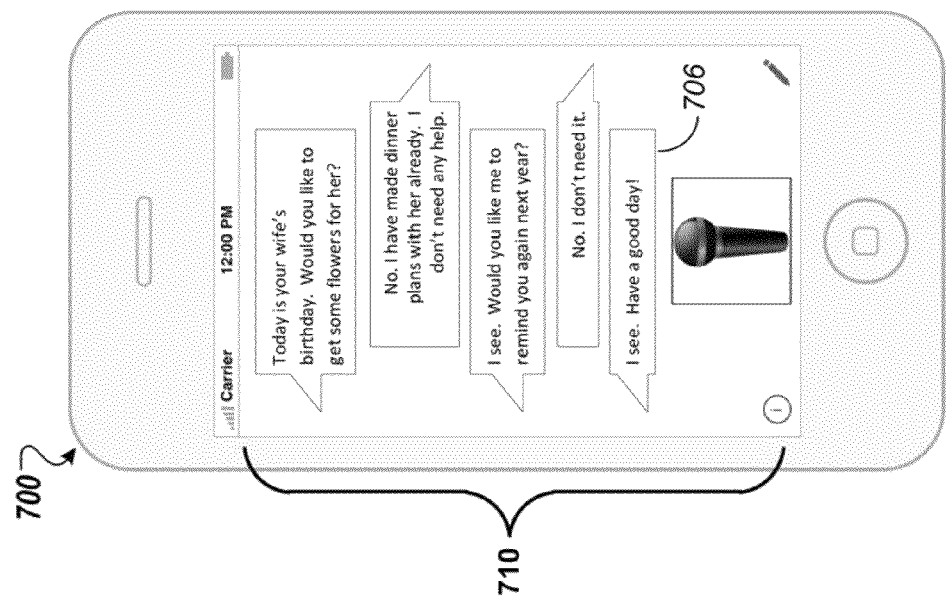

Here, the user responds by saying 'No, I don't need it.', as shown in transcription 705 in FIG. 7D. Based on the user inputs, the conversation assistant 112 terminates the conversation by responding 'I see. Have a good day!', as displayed in transcription 706 in FIG. 7E. If, on the other hand, the user responds by saying "Yes, please," the conversation assistant 112 may update user preferences stored in a user record to indicate that the conversation assistant 112 will no longer provide this recommendation to the user. The user record may, for example, be stored in a user preference store 116 of the client device 110 or, additionally or alternatively, may be stored in a user preference store that is local to the learning engine 192, and/or the CMS 120 or that is remote to the client device 110, the learning engine 192 and/or the CMS 120 but accessible across the network 130. In some implementations, the interactions between the user and the voice bundle may be stored at the usage log on the device 500, and then transferred to the usage log 182 in the log cloud 180 at a later time.

Figure 8:
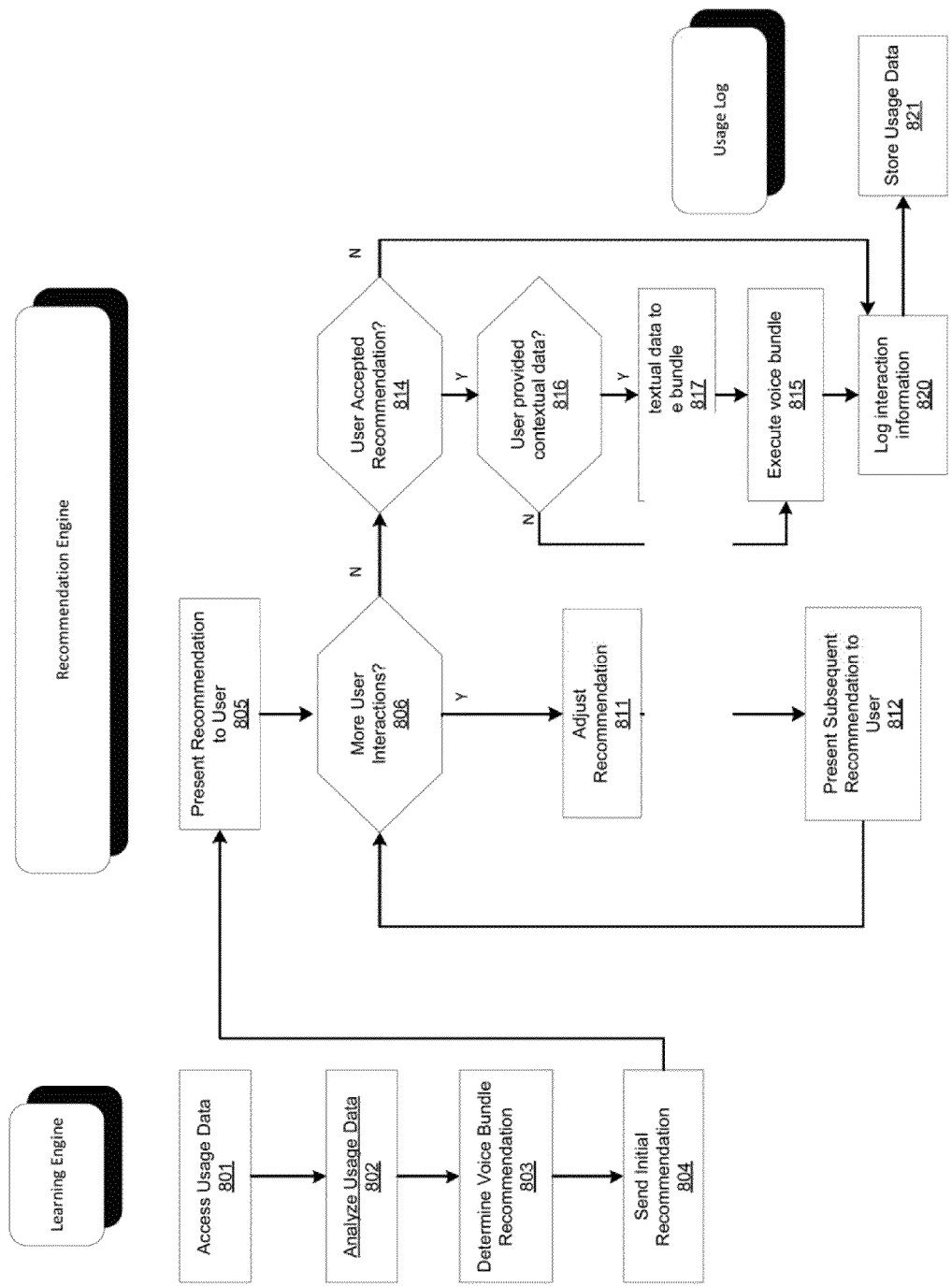
FIG. 8 illustrates a flow chart illustrating an example process for proactively recommending a voice bundle application to a user based on usage data, and interacting with the user locally on the electronic device.

FIG. 8 illustrates a flow chart illustrating an example process for proactively recommending a voice bundle application to a user based on usage data, and interacting with the user locally on the electronic device. In general, the process 800 analyzes usage data, provides a voice recommendation to the user, and interacts with the user locally on the electronic device through natural speech. Without sending interaction data to servers for remote processing, the response time of the conversation assistant may be faster and more natural to the user. The process 800 will be described as being performed by a computer system comprising one or more computers, for example, the communication system 100 as shown in FIG. 1.

The learning engine 192 accesses usage data from the usage log 182 (801). In general, the usage log 182 stores usage data including information associated with the user of the client device 110, as authorized by the user. In some implementations, the learning engine 192 may access usage data stored within a specified period of time (e.g., usage data in the month of January, or usage data in the year of 2012). In some implementations, the learning engine 192 may access usage data associated with one or more non-voice based applications owned by the user (e.g., a calendar application on the electronic device). In some implementations, the learning engine 192 may access usage data associated with one or more voice bundles that the user has accessed in the past (e.g. a pizza-delivery-service voice bundle the user has used previously to order pizza). In some implementations, the learning engine 192 may access usage data associated with other users to compile usage data for a particular group of individuals (e.g., a group of individuals that have used the pizza-deliver-service voice bundle in the past month, or a group of individuals that have expressed interests in a particular service in their personal settings associated with their respective electronic devices).

The learning engine 192 analyzes the usage data to determine a recommendation to be presented to the user (802). In some implementations, the learning engine 192 performs the analysis in the learning cloud 190. In some other implementations, the learning engine 192 performs the analysis in parallel with other servers in the learning cloud 190. In some other implementations, the learning engine 192 may be integrated with the CMS 120 and performs the analysis in the CMS 120.

Based on the analysis, the learning engine 192 determines a voice bundle recommendation to the user (803). In some implementations, the recommendation may include one or more set of instructions for the recommendation engine 114. In some implementations, the recommendation may also include instructions to activate a voice bundle stored in the client device 110. In some other implementations, the recommendation may include a link to access a voice bundle stored in the voice bundles repository 142 that has not been installed on the client device 110. In some implementations, the recommendation may include other contextual information related to the user, such as time or location information for presenting the recommendation to the user.

The learning engine 192 sends the initial recommendation to the recommendation engine 114 (804). In some implementations, the learning engine 192 may send the recommendation upon determination of the voice bundle recommendation. In some other implementations, the learning engine 192 may store the recommendation, and provide the recommendation when the recommendation engine 114 queries for a recommendation.

The recommendation engine 114 presents the recommendation to the user of the electronic device (805). In general, the recommendation engine 114 presents the recommendation and interacts with the user by voice. The user may also interact with the recommendation engine 114 by inputting texts on the electronic device. In some implementations, the recommendation engine 114 may present the recommendation to the user at specific time and place, as determined by the learning engine 192 based on the usage log 182. For example, the recommendation may contain instructions to provide a recommendation only if the recommendation engine 114 has determined that the electronic device is located at the user's home. The recommendation engine 114 may communicate with other components on the electronic device (e.g. GPS module, calendar, or sensors on the electronic device) to determine specific contexts associated with the user before presenting the recommendation. In some implementations, the recommendation engine 114 may present the recommendation to the user based on specific user-defined settings on the electronic device. For example, the recommendation engine 114 may delay presenting the recommendation if the user has turned the electronic device to silent mode. In some implementations, the recommendation engine 114 may alert the user (e.g. through silent vibrations) that a recommendation is available before presenting the recommendation to the user.

The recommendation engine 114 determines whether the user has provided additional interactions (806). In general, the user may be interested in the voice bundle recommended by the recommendation engine 114, but may want to provide additional information. For example, if the voice bundle is associated with ordering a pizza, the user may want to provide additional information on the topping, the size, and the delivery time before the recommendation engine 114 launches the voice bundle. The electronic device may have sufficient computing power to interpret such information, and would not send the interaction data to remote servers for processing.

Based on the received interactions, the recommendation engine 114 adjusts the recommendation (811). In some implementations, the recommendation engine 114 determines that the received interactions are context information for the voice bundle, the recommendation engine 114 may store the received interactions in local caches of the electronic device. In some implementations, the recommendation engine 114 may determine additional response to the user based on the received interactions. In some implementations, the recommendation engine 114 may determine that no additional information is required from the user. The recommendation engine 114 then presents the subsequent recommendation to the user (812) for additional interactions.

The recommendation engine 114 determines there is no more user interaction, the recommendation engine 114 determines whether the recommendation has been accepted by the user (814). If the recommendation engine 114 determines that the user has accepted the recommendation, the recommendation engine 114 determines whether user has provided contextual data from the user interaction (816). If the recommendation engine 114 determines that the user has not provided contextual data, the recommendation engine 114 executes the voice bundle on the user's electronic device (815). Notably, the user may accept an initially presented recommendation but then may reject a subsequently adjusted recommendation that asks the user to confirm contextual details. For example, the user may accept the recommendation to order pizza for the football game but may reject the adjusted recommendation that the user submit the same pizza order as was submitted by the user the last time the user ordered pizza. The acceptance of the initially presented recommendation will trigger execution of the corresponding pizza shop voice bundle irrespective of whether the user then rejects one or more subsequent adjusted pizza order recommendations. The user's rejection of one or more of the subsequent adjusted pizza order recommendations simply results in additional context information corresponding to those subsequent adjusted recommendations not being preloaded by the pizza shop voice bundle. In the above example, the user's rejection of the adjusted recommendation results in the pizza shop voice bundle being executed without the additional context information related to the last order (i.e., without preloading the voice bundle with, for example, a request for an order of pizza that is identical to the last order submitted by the user via use of the pizza shop voice bundle or otherwise).

If the recommendation engine 114 determines that the user has provided contextual data (816), the recommendation engine may load the context data to the voice bundle (817). The interactions between the user and the voice bundle may be stored at the usage log 290 on the electronic device (820), and then transferred to the usage log 182 in the log cloud 180 at a later time (821).

FIGS. 9A-9G are illustrations of an exemplary device 900 displaying a series of screenshots of a GUI 910 of a proactive conversation assistant performing voice-based interactions, and where the proactive conversation assistant gathers all necessary information to process the user request in a voice bundle, and launch and process user request in a voice bundle without further user prompt. The device 900 may be similar to the client device 110 such that the GUI 910 may represent the GUI of the conversation assistant 112. However, in other implementations, the device 900 may correspond to a different device. The example below describes the device 900 as implemented in the communications system 100. However, the device 900 also may be implemented in other communications systems or system configurations. In addition, the process of determining and receiving the recommendation, the communication between the recommendation 114 and the learning engine 192, and the interactions between the conversation assistant 112 and the user, as described in this example, may follow the example flow 800. However, in other implementations, the sequence of the flow or the components involved may be different from the example flow 800.

Referring to the interaction flow illustrated by the series of screenshots in FIGS. 9A-9G, the learning engine 192 determines a recommendation for the user of the device 900 based on calendar information and past voice bundle usage stored in the usage log 182, and sends the voice bundle recommendation to the recommendation engine 114. In this particular example, the learning engine 192 may determine that the user has ordered a pizza each time a football game has been on for the past four weeks, and suggest a recommended voice bundle to the recommendation engine 114. When the recommendation engine 114 receives a voice bundle recommendation from the learning engine 192, the conversation assistant 112 says to the user, 'Would you like to order pizza for the football game today?', as displayed in transcription 901 and shown in FIG. 9A.

Figure 9A:
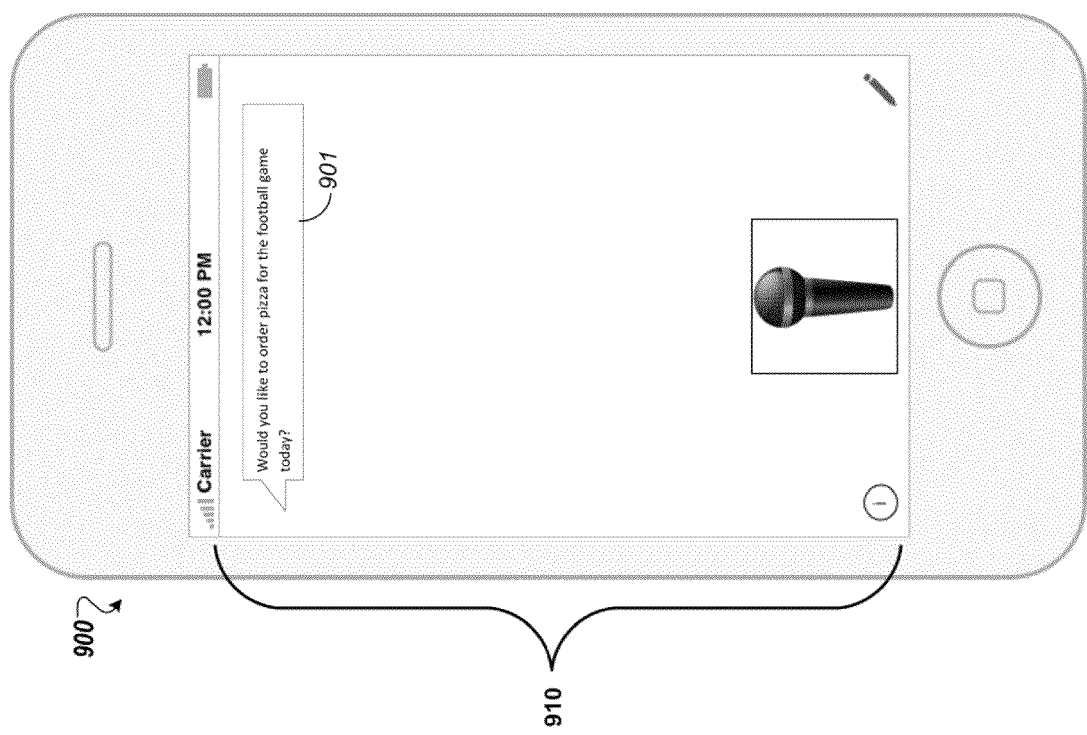
FIGS. 9A-9G are illustrations of an exemplary device displaying a series of screenshots of a GUI of a proactive conversation assistant performing voice-based interactions, and where the proactive conversation assistant gathers all necessary information to process the user request in a voice bundle, and launch and process user request in a voice bundle without further user prompt.
Figure 9B:
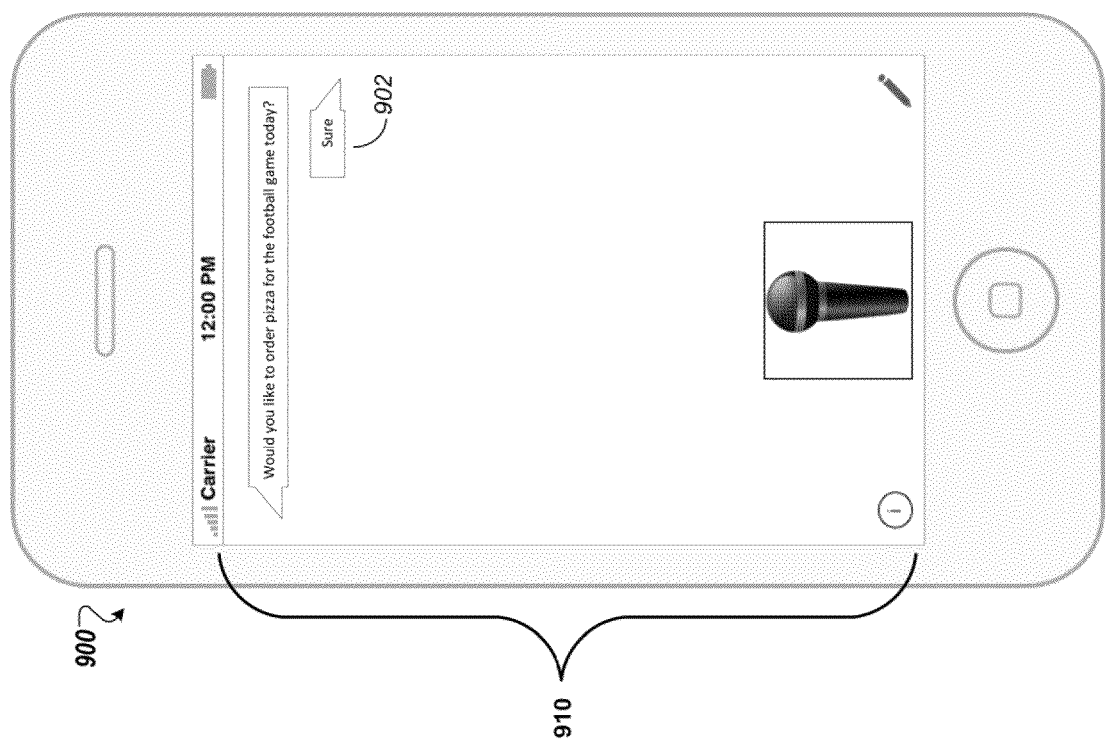
Figure 9C:
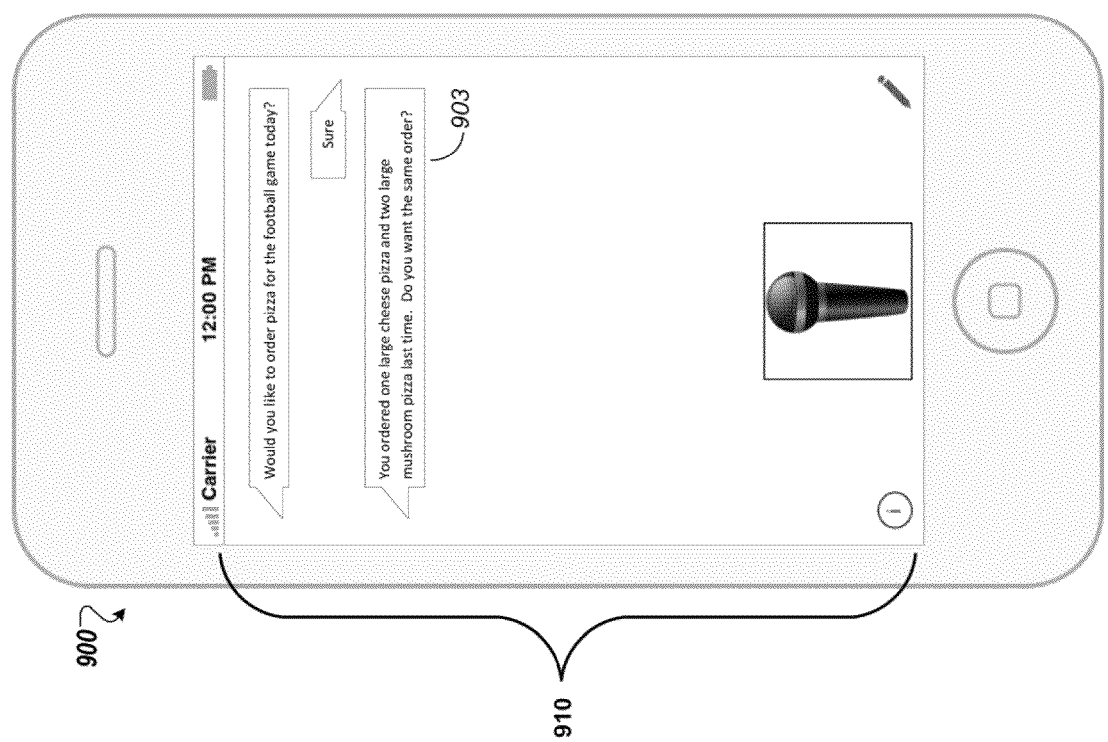

In this particular example, the user says 'Sure.' Once the conversation assistant 112 has successfully processed the user speech, the transcribed speech is displayed in transcription 902, as shown in FIG. 9B. After the user says 'Sure,' the conversation assistant 112 attempts to gather more information regarding the pizza order before initializing the pizza voice bundle. In this particular example, the conversation assistant 112 asks the user 'You ordered one large cheese pizza and two large mushroom pizza last time. Do you want the same order?', as displayed in transcription 903 in FIG. 9C. In some implementations, the information on the previous order may be stored at the usage log on the device 902. In some other implementations, the information on the previous order may be stored at the usage log 182 in the log cloud 180.

Figure 9D:
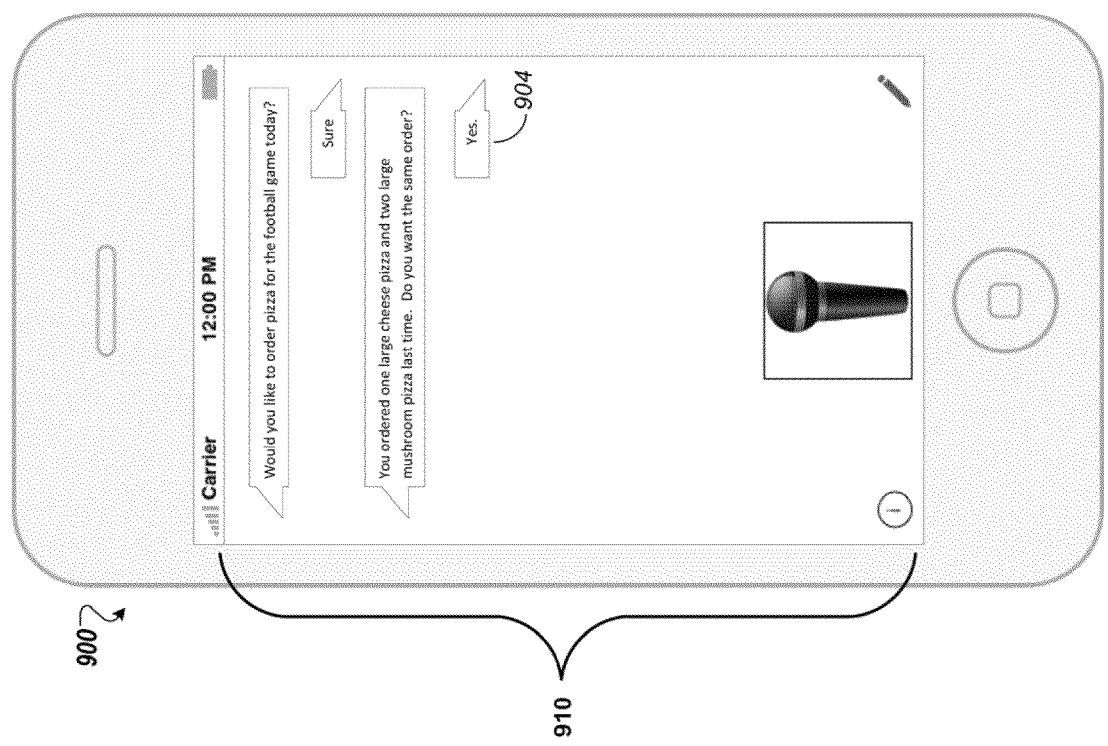
Figure 9E:
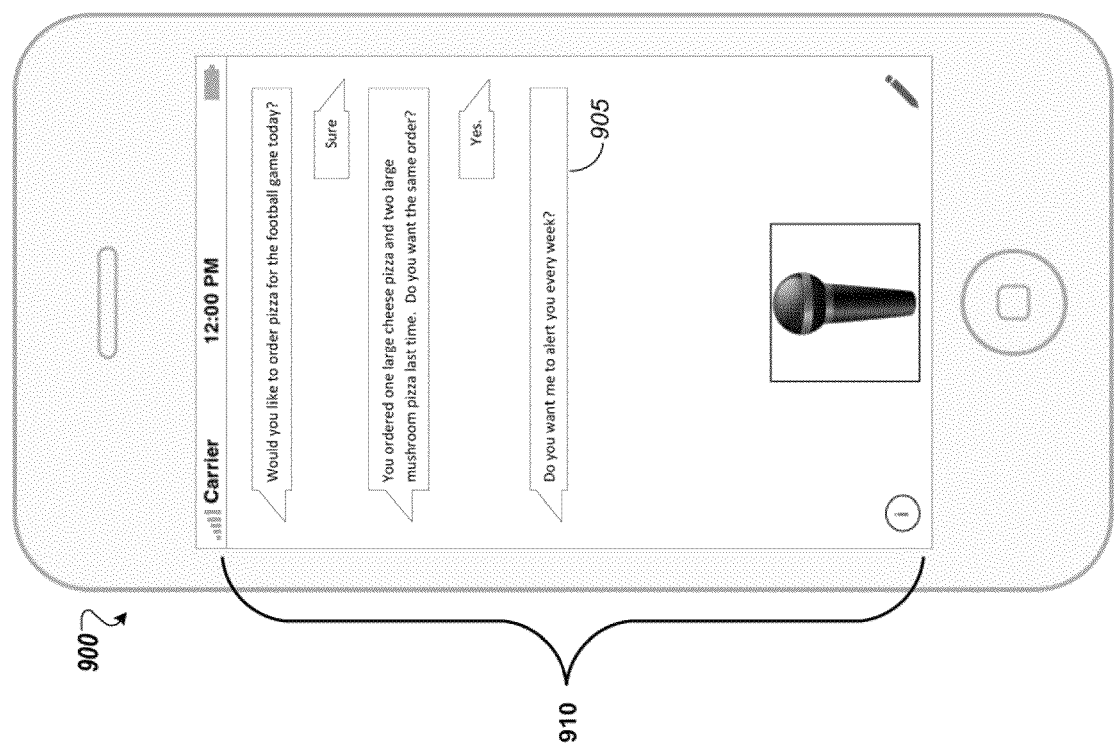
Figure 9F:
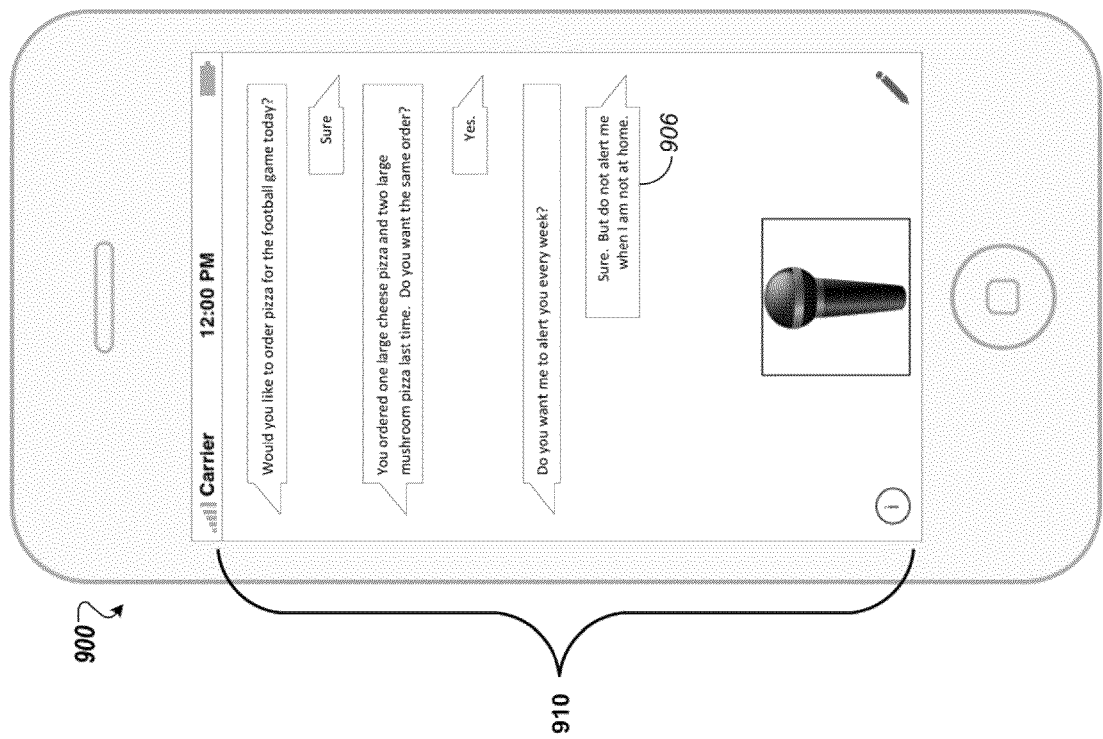
Figure 9G:
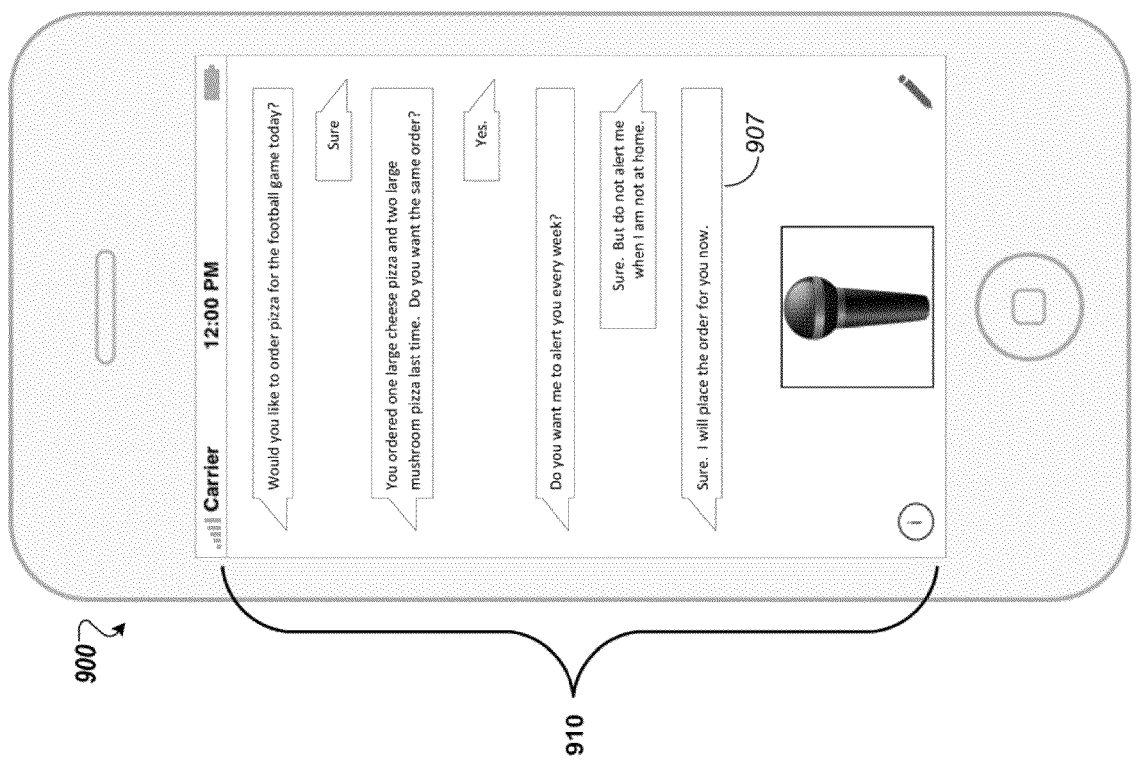

Here, the user responds by saying 'Yes.', as displayed in transcription 904 in FIG. 9D. The recommendation engine 114 may store this response as context data in the local caches of the device 902. Based on this response, the recommendation engine 114 determines another question for the user, and asks, 'Do you want me to alert you every week?', as displayed in transcription 905 in FIG. 9E.

In this particular example, the user responds by saying 'Sure. But do not alert me when I am not at home', as displayed in transcription 906 in FIG. 9F. In some implementations, the recommendation engine 114 may store this response in the usage log of the device 900. Based on this response, the recommendation engine 114 determines that an order can be made without additional user inputs, and says to the user, 'Sure. I will place the order for you now', as displayed in transcription 907 in FIG. 9G. In some implementations, the recommendation engine 114 may load the context data saved in the local caches to the voice bundle and executes the voice bundle. Since the user has provided sufficient information to the recommendation engine 114 to place the order (e.g. time, place, quantity, and type of pizza), the conversation assistant 112 can process the order without further inputs from the user. In some implementations, the interactions between the user and the voice bundle may be stored at the usage log on the device 900, and then transferred to the usage log 182 in the log cloud 180 at a later time.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A computer-implemented method comprising:
    accessing, by a remote learning engine, usage data associated with a user of a telephonic device for determining a recommended voice bundle application for the user;
    identifying, by the remote learning engine based on the accessed usage data, a service or a product that is likely to be of interest to the user;
    determining, by the remote learning engine based on the accessed usage data and before the user requests to initiate the recommended voice bundle application, the recommended voice bundle application for the user, the recommended voice bundle application being a voice application that, when executed by the telephonic device, results in a simulated multi-step spoken interaction between the telephonic device and the user to enable the user to receive the identified service or the identified product;
    transmitting a recommendation that is based on the usage data and associated with the recommended voice bundle application, from the remote learning engine to the telephonic device;
    presenting through a voice communication, by the telephonic device to the user, the recommendation without executing the recommended voice bundle application;
    determining, by the telephonic device, whether the user through a voice communication has accepted the recommendation;
    in response to determining that the user has accepted the recommendation:
        determining whether the recommended voice bundle application is installed on the telephonic device;
        in response to determining that the recommended voice bundle application is installed on the telephonic device, executing, by the telephonic device, the recommended voice bundle application on the telephonic device; and
        in response to determining that the recommended voice bundle application is not installed on the telephonic device:
            (i) transmitting, from the remote learning engine to the telephonic device, the recommended voice bundle application; and
            (ii) executing, by the telephonic device, the recommended voice bundle application on the telephonic device; and
    in response to determining that the user has not accepted the recommendation, not executing the recommended voice bundle application on the telephonic device.

2. The method of claim 1,
    wherein the recommended voice bundle application comprises a software application that includes instructions executable by the telephonic device to perform a call flow, and
    wherein the call flow comprises a sequence of at least two prompt instructions and at least two grammar instructions executable to result in the simulated multi-step spoken conversation between the telephonic device and the user, each of the at least two prompt instructions being executable to ask for information from the user and each of the at least two grammar instructions being executable to interpret information spoken to the telephonic device by the user.

3. The method of claim 2, wherein each of the at least two prompt instructions is executable by the telephonic device to ask for information from the user and each of the at least two grammar instructions is executable by the telephonic device to interpret information spoken to the telephonic device by the user.

4. The method of claim 2, wherein transmitting a recommendation comprises transmitting a signal that, when received by the telephonic device, initiates a communication to the user that audibly or visually presents the recommendation to the user.

5. The method of claim 4, wherein the communication occurs through execution of an initial call flow performed by the telephonic device to simulate an initial multi-step spoken conversation between the telephonic device and the user that audibly presents the recommendation to the user, that solicits user acceptance or rejection of the recommendation, and that, conditioned on the user accepting the recommendation, is then followed by performance, by the telephonic device, of the call flow associated with the recommended voice bundle application to enable the user to receive the identified service or the identified product.

6. The method of claim 4, wherein the communication occurs by visually displaying as text to the user.

7. The method of claim 6, wherein the text is displayed during performance of an initial call flow by the telephonic device to simulate an initial multi-step spoken conversation between the telephonic device and the user that is distinct from the simulated multi-step spoken conversation corresponding to the recommended voice bundle application.

8. The method of claim 1, further comprising updating the usage data associated with the user in response to determining that the user has accepted the recommendation.

9. The method of claim 1, further comprising presenting, on a display of the telephonic device, a transcription of the voice communications between the telephonic device and the user.

10. The method of claim 1, further comprising:
in response to determining that the user has accepted the recommendation, determining that the recommended voice bundle application is not installed on the telephonic device; and
transmitting, from the remote learning engine to the telephonic device, the recommended voice bundle application.

11. The method of claim 1, wherein accessing usage data further comprises accessing usage data of one or more applications or usage data of one or more voice bundle applications installed on the telephonic device.

12. The method of claim 1, wherein accessing usage data further comprises accessing compiled usage data of a particular group of users associated with the user.

13. The method of claim 1, wherein transmitting a recommendation associated with the recommended voice bundle application further comprises:
determining a contextual condition, wherein the contextual condition includes a time and a location for transmitting the recommendation; and
transmitting the recommendation that satisfies the determined contextual condition.

14. The method of claim 1, wherein the recommended voice bundle application is implemented using State Chart Extensible Markup Language (SCXML).

15. The method of claim 1, wherein the recommendation is a communication that recommends to the user that the user authorize the launching of the recommended voice bundle application to facilitate the acquisition of the identified product or the identified service by the user.

16. A system comprising:
a usage data store configured to store usage information;
a learning engine including one or more computer processors, the learning engine configured to:
access usage information associated with a user of a telephonic device from the usage data store for determining a recommended voice bundle application for the user;
identify a service or a product that is likely to be of interest to the user based on the accessed usage information;
determine the recommended voice bundle application based on the accessed usage information for the user and before the user requests to initiate the recommended voice bundle application, the recommended voice bundle application being a voice application that, when executed by the telephonic device, results in a simulated multi-step spoken interaction between the telephonic device and the user to enable the user to receive the identified service or the identified product; and
transmit a recommendation that is based on the usage data and associated with the recommended voice bundle application, to the telephonic device; and the telephonic device configured to:
present through a voice communication to the user, the recommendation without executing the recommended voice bundle application;
determine whether the user through a voice communication has accepted the recommendation;
in response to determining that the user has accepted the recommendation:
determine whether the recommended voice bundle application is installed on the telephonic device;
in response to determining that the recommended voice bundle application is installed on the telephonic device, execute the recommended voice bundle application; and
in response to determining that the recommended voice bundle application is not installed on the telephonic device:
(i) obtain from the remote learning engine, the recommended voice bundle application; and
(ii) execute, by the telephonic device, the recommended voice bundle application; and
in response to determining that the user has not accepted the recommendation, not execute the recommended voice bundle application; and
a voice bundle application data store for storing a plurality of voice bundle applications including the recommended voice bundle application.

17. The system of claim 16,
wherein the recommended voice bundle application comprises a software application that includes instructions executable by the telephonic device to perform a call flow, and
wherein the call flow comprises a sequence of at least two prompt instructions and at least two grammar instructions executable to result in the simulated multi-step spoken conversation between the telephonic device and the user, each of the at least two prompt instructions being executable to ask for information from the user and each of the at least two grammar instructions being executable to interpret information spoken to the telephonic device by the user.

18. The system of claim 17, wherein each of the at least two prompt instructions is executable by the telephonic device to ask for information from the user and each of the at least two grammar instructions is executable by the telephonic device to interpret information spoken to the telephonic device by the user.

19. The system of claim 17, wherein transmitting a recommendation comprises transmitting a signal that, when received by the telephonic device, initiates a communication to the user that audibly or visually presents the recommendation to the user.

20. The system of claim 19, wherein the communication occurs through execution of an initial call flow performed by the telephonic device to simulate an initial multi-step spoken conversation between the telephonic device and the user that audibly presents the recommendation to the user, that solicits user acceptance or rejection of the recommendation, and that, conditioned on the user accepting the recommendation, is then followed by performance, by the telephonic device, of the call flow associated with the recommended voice bundle application to enable the user to receive the identified service or the identified product.

21. The system of claim 16, further comprising:
a recommendation engine executable by the telephonic device, wherein the recommendation engine is configured to:
receive the recommendation from the learning engine;
present through a voice communication to the user, the recommendation without executing the recommended voice bundle application;
determine that the user through voice communications has accepted the recommendation; and
in response to determining that the user has accepted the recommendation, execute the recommended voice bundle application on the telephonic device.

22. The system of claim 16, wherein the learning engine is configured to:
receive a response from the recommendation engine indicating that the user has accepted the recommendation; and
update the usage information associated with the user at the usage data store in response to receiving the response.

23. The system of claim 16, wherein accessing the usage data associated with the user of the telephonic device further comprises accessing usage data of one or more applications or usage data of one or more voice bundle applications stored at the telephonic device.

24. The system of claim 16, wherein determining, by the learning engine, the recommended voice bundle application comprises determining the recommended voice bundle application based on the service or the product identified as being likely to be of interest to the user.

25. The system of claim 16, wherein transmitting a recommendation comprises transmitting a signal that, when received by the telephonic device, initiates a communication to the user that audibly or visually presents the recommendation to the user.

26. A system comprising:
one or more computers and one or more non-transitory computer-readable storage devices storing instructions that when executed by the one or more computers cause the one or more computers to perform operations comprising:
accessing usage data associated with a user of a telephonic device for determining a recommended voice bundle application for the user;
identifying a service or a product that is likely to be of interest to the user based on the accessed usage data;
determining the recommended voice bundle application based on the accessed usage data for the user and before the user requests to initiate the recommended voice bundle application, the recommended voice bundle application being a voice application that, when executed by the telephonic device, results in a simulated multi-step spoken interaction between the telephonic device and the user to enable the user to receive the identified service or the identified product; and
transmitting a recommendation that is based on the usage data and associated with the recommended voice bundle application, to the telephonic device; and
the telephonic device configured to:
present through a voice communication to the user, the recommendation without executing the recommended voice bundle application;
determine whether the user through a voice communication has accepted the recommendation;
in response to determining that the user has accepted the recommendation: determine whether the recommended voice bundle application is installed on the telephonic device;
in response to determining that the recommended voice bundle application is installed on the telephonic device, execute the recommended voice bundle application; and
in response to determining that the recommended voice bundle application is not installed on the telephonic device:
(i) obtain, from the one or more computers, the recommended voice bundle application; and
(ii) execute, by the telephonic device, the recommended voice bundle application; and
in response to determining that the user has not accepted the recommendation, not execute the recommended voice bundle application.

27. The system of claim 26,
wherein the recommended voice bundle application comprises a software application that includes instructions executable by the telephonic device to perform a call flow, and
wherein the call flow comprises a sequence of at least two prompt instructions and at least two grammar instructions executable to result in the simulated multi-step spoken conversation between the telephonic device and the user, each of the at least two prompt instructions being executable to ask for information from the user and each of the at least two grammar instructions being executable to interpret information spoken to the telephonic device by the user.

28. The system of claim 27, wherein each of the at least two prompt instructions is executable by the telephonic device to ask for information from the user and each of the at least two grammar instructions is executable by the telephonic device to interpret information spoken to the telephonic device by the user.

29. The system of claim 22, wherein the recommendation is a communication that recommends to the user that the user authorize the launching of the recommended voice bundle application to facilitate the acquisition of the identified product or the identified service by the user.

* * * * *